US006486389B1

(12) United States Patent
Suzuki et al.

(10) Patent No.: US 6,486,389 B1
(45) Date of Patent: Nov. 26, 2002

(54) METHOD AND APPARATUS FOR PRODUCING A WAVEFORM WITH IMPROVED LINK BETWEEN ADJOINING MODULE DATA

(75) Inventors: Hideo Suzuki; Hideyuki Masuda, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 187 days.

(21) Appl. No.: 09/671,024

(22) Filed: Sep. 26, 2000

(30) Foreign Application Priority Data

Sep. 27, 1999 (JP) .......................................... 11-273178

(51) Int. Cl.[7] ............................ G01H 7/00; G01H 1/24

(52) U.S. Cl. ............................ 84/603; 84/626; 84/629

(58) Field of Search .................. 84/600, 601, 603–605, 84/626, 629, 677, 662, 663

(56) References Cited

U.S. PATENT DOCUMENTS

| | | | | | |
|---|---|---|---|---|---|
| 4,597,318 | A | | 7/1986 | Nikaido et al. | |
| 5,300,724 | A | * | 4/1994 | Medovich | 84/604 |
| 5,442,127 | A | * | 8/1995 | Wachi et al. | 84/603 |
| 5,698,807 | A | | 12/1997 | Massie et al. | |
| 5,763,800 | A | * | 6/1998 | Rossum et al. | 84/603 |
| 5,792,971 | A | * | 8/1998 | Timis et al. | 369/83 |
| 5,808,222 | A | * | 9/1998 | Yang | 84/603 |
| 5,973,255 | A | * | 10/1999 | Tanji | 84/604 |
| 6,008,446 | A | * | 12/1999 | Van Buskirk et al. | 84/603 |
| 6,169,241 | B1 | * | 1/2001 | Shimizu | 84/604 |
| 6,365,817 | B1 | * | 4/2002 | Suzuki et al. | 84/603 |

FOREIGN PATENT DOCUMENTS

| | | |
|---|---|---|
| EP | 0847 039 | 6/1998 |
| EP | 0856 830 | 8/1998 |
| EP | 0 907 160 | 4/1999 |
| EP | 00 12 0854 | 12/2001 |
| JP | 10-307587 | 11/1998 |

* cited by examiner

*Primary Examiner*—Jeffrey Donels
(74) *Attorney, Agent, or Firm*—Morrison & Foerster LLP

(57) ABSTRACT

When adjoining, i.e. Preceding and succeeding, waveform-forming module data are to be interlined, a mutual approaching rate is designated, and the preceding and succeeding module data are modified in accordance with the designated mutual approaching rate. The modification based on the mutual approaching rate allows the preceding and succeeding module data to approach each other and thus provides for smooth link or connection between the two module data. Further, by designating a link starting point in the preceding module data and/or a link ending point in the succeeding module data, the preceding and succeeding module data are interlined to an appropriate degree depending on a difference or degree of similarity between the two module data. If the preceding or succeeding module data include data of a plurality of vectors, a time relationship between the preceding and succeeding module data is evaluated, and the data of one or more of the vectors is thinned out, as necessary, in accordance with the evaluated time relationship so that the two module data can be interlined appropriately.

21 Claims, 13 Drawing Sheets

METHOD AND APPARATUS FOR PRODUCING A WAVEFORM WITH IMPROVED LINK BETWEEN ADJOINING MODULE DATA

BACKGROUND OF THE INVENTION

The present invention relates generally to apparatus and methods for producing waveforms of musical tones, voices or other sounds on the basis of waveform data supplied from memory or the like, and more particularly to an improved waveform producing apparatus and method capable of producing waveforms that faithfully represent tone color variations affected by a player using various styles of rendition (i.e., performing techniques) or various sorts of articulation unique to a natural musical instrument. It should be appreciated that the basic principles of the present invention can be applied extensively to every type of equipment, apparatus and methods having the function of generating musical tones, voices or any other sounds, such as automatic performance devices, computers, electronic game devices and multimedia-related devices, not to mention electronic musical instruments. Also, let it be assumed that the terms "tone waveform" in this specification are not necessarily limited to a waveform of a musical tone alone and are used in a much broader sense that may embrace a waveform of a voice or any other type of sound.

The so-called "waveform memory readout" technique has already been well known, which prestores waveform data (i.e., waveform sample data) coded in a given coding scheme, such as the POM (Pulse Code Modulation), DPCM (Differential Pulse Code Modulation) or ADPCM (Adaptive Differential Pulse Code Modulation), and then reads out the thus-prestored waveform data at a rate corresponding to a desired tone pitch to thereby produce a tone waveform. So far, various types of "waveform memory readout" technique have been proposed and known in the art, most of which are directed to producing a waveform covering from the start to end of a tone. As one specific example of the waveform memory readout technique, there has been known a scheme of prestoring waveform data of a complete waveform of a tone covering from the start to end thereof. As another example of the waveform memory readout technique, there has been known a scheme of prestoring waveform data of a complete waveform only for a particular portion, such as an attach portion, of a tone presenting relatively complex variations and prestoring a predetermined loop waveform for a sustain portion and the like presenting less variations. In this patent specification, the terms "loop waveform" are used to refer to a waveform to be read out repeatedly, i.e., in a looped fashion.

With the conventional waveform memory readout scheme of prestoring waveform data of a complete waveform of a tone covering from the start to end thereof or prestoring waveform data of a complete waveform only for a particular portion, such as an attach portion, of a tone, however, it has been necessary to prestore a great number of various waveform data corresponding to a variety of styles of rendition (or various sorts of articulation), which would undesirably require a large storage capacity.

Further, although the above-mentioned scheme of prestoring waveform data of a complete waveform of a tone can faithfully express tone color variations effected using various styles of rendition (or various sorts of articulation) unique to a natural musical instrument, it can only reproduce the tone in just the same way as the prestored waveform data and thus would afford very poor controllability and editability. For instance, with this waveform memory readout scheme, it has been extremely difficult to control time-axial and other characteristics of the waveform data, corresponding to a desired style of rendition (or sort of articulation), in accordance with performance data.

SUMMARY OF THE INVENTION

It is therefore an object of the present invention to provide a waveform producing technique which can produce high-quality waveform data corresponding to a variety of styles of rendition (or various sorts of articulation) in a simplified manner with greatly increased facility and controllability. Particularly, the present invention seeks to provide a waveform producing method and apparatus using an improved technique of interlinking adjoining waveform-forming module data.

In order to accomplish the above-mentioned object, the present invention provides a method of producing a waveform using waveform-forming module data, which comprises the steps of: supplying preceding module data and succeeding module data; supplying a modifying rate; modifying the preceding module data and succeeding module data in accordance with the modifying rate; and producing a waveform on the basis of the modified preceding module data and succeeding module data.

In synthesizing high-quality style-of-rendition waveforms, it is necessary to appropriately interlink (interconnect) the plurality of style-of-rendition waveforms in accordance with the passage of time. In such high-quality style-of-rendition waveform synthesis, the above-mentioned module data are each organized as data for producing a style-of-rendition waveform, i.e. style-of-rendition module data, and there is a need to smoothly interlink every adjoining style-of-rendition module data. Thus, the present invention is arranged to supply a modifying rate, which indicates or determines which of the preceding module data and succeeding module data should be modified and at which rate the module data should be modified. The modification based on the modifying rate allows the preceding and succeeding module data to approach each other and thus provides for smooth link or connection between the two adjoining module data. In preferred embodiments to be described later, the modifying rate is referred to as a "mutual approaching rate".

The present invention also provides a method of producing a waveform using waveform-forming module data, which comprises the steps of: supplying preceding module data and succeeding module data; designating a link starting point in the preceding module data; modifying data in the preceding module data at and after the link starting point; and producing a waveform on the basis of the modified preceding module data and the succeeding module data. For example, if there is a relatively great difference between the preceding and succeeding module data, an earlier link starting point is set so that the two modules can be interlinked as smoothly as possible. It is very effective to thus designate the link starting point appropriately depending on the situation.

Alternatively, a link ending point in the succeeding module data may be designated so to as modify data in the succeeding module data at and after the designated link ending point. If there is a relatively great difference between the preceding and succeeding module data, a later link ending point is set so that the two modules can be interlinked as smoothly as possible. It is also very effective to thus designate the link ending point appropriately depending on the situation. It should be appreciated that both, rather than just one, of the link starting and ending points may be designated appropriately independently of each other.

The present invention also provides a method of producing a waveform using waveform-forming module data, which comprises the steps of: supplying preceding module data and succeeding module data, the preceding module data including data of a plurality of vectors; thinning out the data of one or more of the plurality of vectors in the preceding module data in accordance with a evaluated time relationship between the preceding module data and the succeeding module data and; and producing a waveform on the basis of the thinned-out preceding module data and the succeeding module data. In this case, the preceding module data can produce a waveform by a combination of the plurality of vectors. Thinning out the data of one or more of the vectors will not adversely affect waveform reproduction corresponding to the preceding module data. If the trailing end of the preceding module data runs into or too close to the leading end of the succeeding module data, then the two module data could not be interlinked appropriately. To avoid such an inconvenience, the present invention is designed to evaluate a time relationship between the preceding and succeeding module data and thin out the data of selected one or more of the vectors. Alternatively, the succeeding module data may include data of a plurality of vectors, in which case the data of selected one or more of the vectors in the succeeding module data may be thinned out.

In the later-described embodiments, the style-of-rendition module data are each organized as data representing behavior of a waveform corresponding to a style of rendition. The waveform behavior can be defined by various waveform factors, which may include, for example, time factors such as a time length of a waveform section corresponding to the style-of-rendition module data and note-on and note-off timing in the waveform section. Also, the style-of-rendition module data may include data representing characteristic behavior of vectors for controlling the waveform to be produced. For example, the "vectors" correspond to various fundamental waveform factors for producing a waveform. Examples of the fundamental waveform factors include a waveform shape (that determines a tone color or timbre), pitch variation over time and amplitude variation over time, and the vector data of these waveform factors are called a waveform shape vector, pitch vector and amplitude vector, respectively. Time vector for performing stretch/compression control on a time-axial progression of the waveform may also be used. The respective time axes of the waveform shape vector, pitch vector, amplitude vector, etc. can be controlled in accordance with the time vector. One example of behavior data, which is included in the style-of-rendition module data to represent the characteristic behavior of the vectors for controlling the waveform to be produced, is one designating a waveform shape vector, pitch vector, amplitude vector, time vector, etc. as mentioned above. Of course, the present invention is applicable as a technique of interconnecting any ordinary waveforms other than style-of-rendition waveforms and may be applied to any ordinary waveform-forming module data other than style-of-rendition module data.

The present invention may be constructed and implemented not only as the method invention as discussed above but also as an apparatus invention. Also, the present invention may be arranged and implemented as a software program for execution by a processor such as a computer or DSP, as well as a storage medium storing such a program. Furthermore, the processor used in the present invention may comprise a dedicated processor based on predetermined fixed hardware circuitry, rather than a general-purpose type processor capable of running software.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
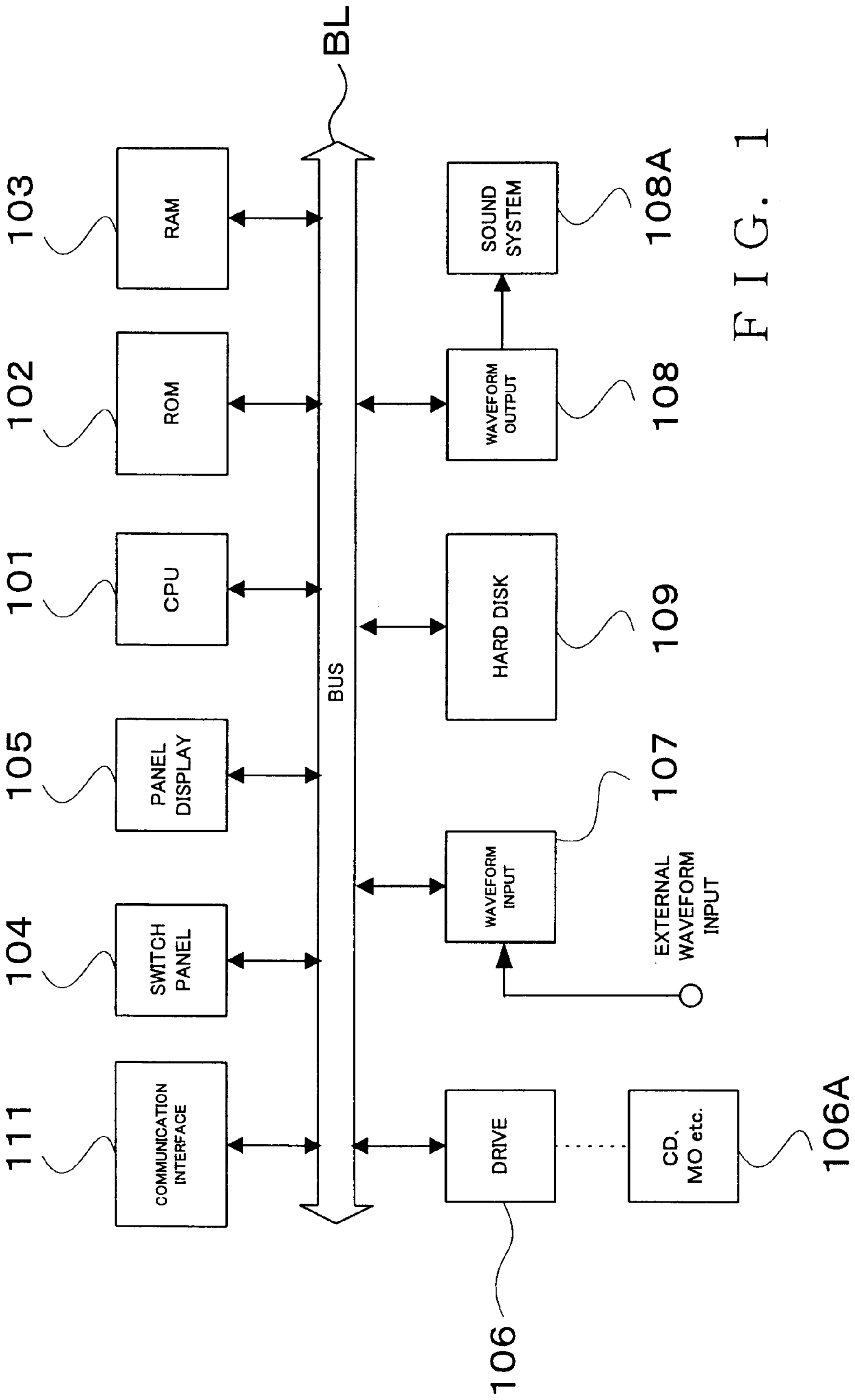
FIG. 1 is a block diagram showing an exemplary hardware organization of a waveform producing apparatus in accordance with a preferred embodiment of the present invention.

FIG. 1 is a block diagram showing an exemplary hardware organization of a waveform producing apparatus in accordance with a preferred embodiment of the present invention. The waveform producing apparatus illustrated here is constructed using a computer, and predetermined waveform producing processing is carried out by the computer executing predetermined waveform producing programs (software). Of course, the waveform producing processing may be implemented by microprograms for execution by a DSP (Digital Signal Processor), rather than by such computer software. Also, the waveform producing processing of the invention may be implemented by a dedicated hardware apparatus that includes discrete circuits or integrated or large-scale integrated circuit. Further, the waveform producing apparatus of the invention may be implemented as an electronic musical instrument, karaoke device, electronic game device, multimedia-related device, personal computer or any other desired form of product.

In FIG. 1, the waveform producing apparatus in accordance with the preferred embodiment of the present invention includes a CPU (Central Processing Unit) 101 functioning as a main control section of the computer, to which are connected, via a bus (e.g., data and address bus) BL, a ROM (Read-Only Memory) 102, a RAM (Random Access Memory) 103, a switch panel 104, a panel display unit 105, a drive 106, a waveform input section 107, a waveform output section 108, a hard disk 109 and a communication interface 111. The CPU 101 carries out various processes directed to "waveform database creation", "tone synthesis based on the created database (software tone generator)", etc. on the basis of predetermined programs, as will be later described in detail. These programs are supplied, for example, from a network via the communication interface 111 or from an external storage medium 106A, such as a CD or MO (Magneto-Optical disk) mounted to the drive 106, and then stored in the hard disk 109. In execution of a desired one of the programs, the desired program is loaded from the hard disk 109 into the RAM 103; however, the programs may be prestored in the ROM 102.

The ROM 102 stores therein various programs and data to be executed or referred to by the CPU 101. The RAM 103 is used as a working memory for temporarily storing various performance-related information and various data generated as the CPU 101 executes the programs, or as a memory for storing a currently-executed program and data related to the program. Predetermined address regions of the RAM 103 are allocated to various functions and used as various registers, flags, tables, memories, etc. The switch panel 104 includes various operators for instructing tone sampling, editing the sampled waveform data, entering various pieces of information, etc. The switch panel 104 may be, for example, in the form of a ten-button keypad for inputting numerical value data, keyboard for inputting character data or panel switches. The switch panel 104 may also include other operators for selecting, setting and controlling a pitch, color, effect, etc. of each tone to be generated. The panel display unit 105 displays various information inputted by the switch panel, the sampled waveform data, etc. and comprises, for example, a liquid crystal display (LCD), CRT (Cathode Ray Tube) and/or the like.

The waveform input section 107 contains an A/D converter for converting an analog tone signal, introduced via an external waveform input device such as a microphone, into digital data (waveform data sampling), and inputs the thus-sampled digital waveform data into the RAM 103 or hard disk 109 as original waveform data from which to produce desired waveform data. In the "waveform database creation" process carried out by the CPU 101, a waveform database of the present invention is created on the basis of the above-mentioned original waveform data. Also, in the "database-based tone synthesis" process carried out by the CPU 101, waveform data of each tone signal corresponding to performance information are produced using the above-mentioned waveform database. Of course, in the instant embodiment, a plurality of tone signals can be generated simultaneously. The thus-produced waveform data of each tone signal are given via the bus BL to the waveform output section 108 and then stored into a buffer thereof as necessary. The waveform output section 108 reads out the buffered waveform data at a predetermined output sampling frequency and then sends the waveform data to a sound system 108A after D/A-converting the data. In this way, each tone signal output from the waveform output section 108 is sounded or audibly reproduced via the sound system 108A. Here, the hard disk 109 is provided for storing data (various data of a later-described style-of-rendition table, code book, etc.) for synthesizing a desired waveform corresponding to waveform data and style of rendition, a plurality of sorts of performance-related data such as tone color data composed of various tone color parameters, and control-related data such as those of various programs to be executed by the CPU 101.

The drive 106 functions to drive a removable disk external storage medium 106A) for storing data (various data of the later-described style-of-rendition table, code book, etc.) for synthesizing a desired waveform corresponding to waveform data and style of rendition, a plurality of sorts of performance-related data such as tone color data composed of various tone color parameters and control-related data such as those of various programs to be executed by the CPU 101. The external storage medium 106A to be driven by the drive 106 may be any one of various known removable-type media, such as a floppy disk (FD), compact disk (CD-ROM or CD-RAM), magneto-optical (MO) disk or digital versatile disk (DVD). Stored contents (control program) of the external storage medium 106A set in the drive 106 may be loaded directly into the RAM 103, without being first loaded into the hard disk 109. The approach of supplying a desired program via the external storage medium 106A or via a communication network is very advantageous in that it can greatly facilitate version upgrade of the control program, addition of a new control program, etc.

Further, the communication interface 111 is connected to a communication network, such as a LAN (Local Area Network), the Internet or telephone lines, via which it may be connected to a desired sever computer or the like (not shown) so as to input a control program and various data or performance information to the waveform producing apparatus. Namely, in a situation where the control program and various data are not contained in the ROM 102 or hard disk 109 of the waveform producing apparatus, these control program and data can be downloaded from the server computer via the communication interface 111 to the apparatus. In such a case, the waveform producing apparatus of the invention, which is a "client", sends a command to request the server computer to download the control program and various data by way of the communication interface 111 and communication network. In response to the command from the client, the server computer delivers the requested control program and data to the waveform producing apparatus via the communication network. The waveform producing apparatus receives the control program and data from the server computer via the communication network and communication interface 111 and accumulatively stores them into the hard disk 109. In this way, the necessary downloading of the control program and various data is completed. It should be obvious that the waveform producing apparatus may further includes a MIDI interface so as to receive MIDI performance information. It should also be obvious that a music-performing keyboard and music operating equipment may be connected to the bus BL so that performance information can be supplied to the waveform producing apparatus by an actual real-time performance. Of course, the external storage medium containing performance information of a desired music piece may be used to supply the performance information of the desired music piece.

Figure 2:
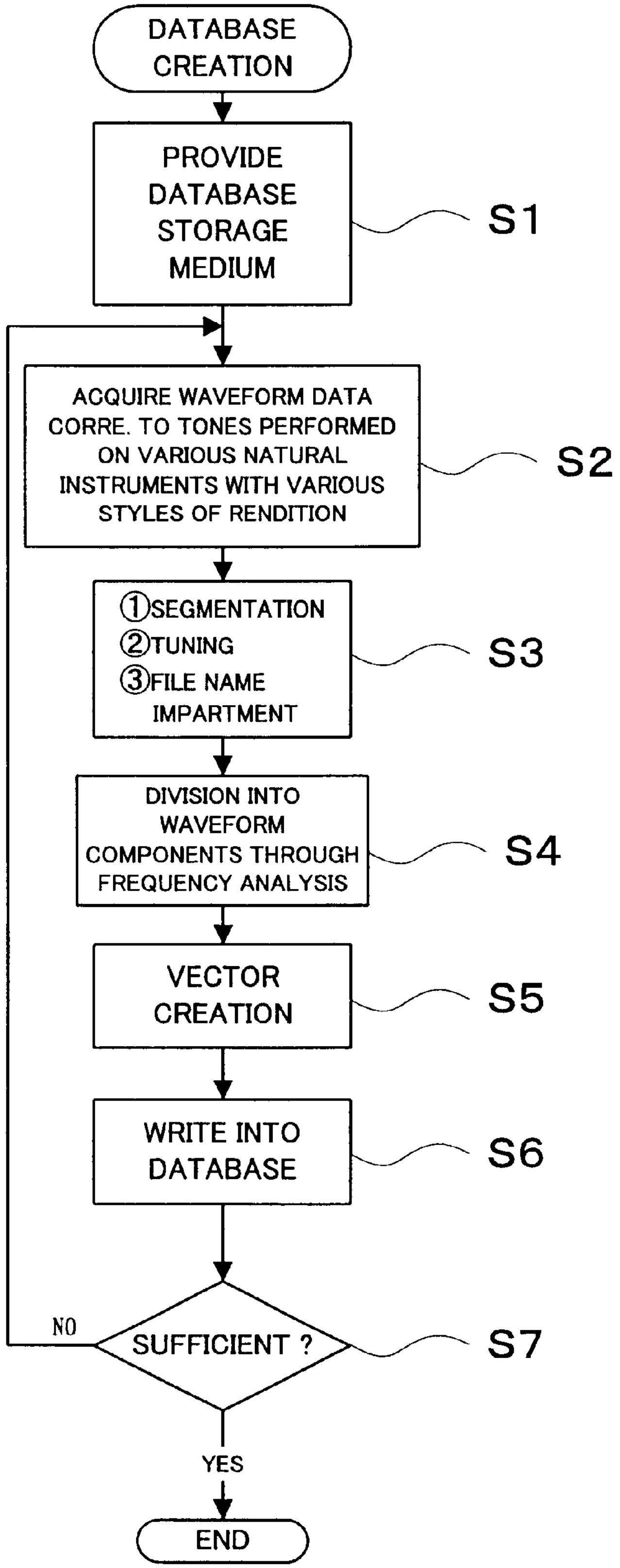
FIG. 2 is a flow chart showing an exemplary operational sequence of a waveform database creation process carried out in the waveform producing apparatus of FIG. 1.

FIG. 2 is a flow chart showing an exemplary operational sequence of the waveform database creation process carried out in the above-described waveform producing apparatus of the invention, which is directed to creating vector data on the basis of waveforms of tones actually performed with various styles of rendition or performing techniques (or various sorts of articulation) in such a manner that the created vector data correspond to various styles of rendition (sorts of articulation).

First, at step S1, a database storage medium, such as the hard disk 109, is provided for storing data of the later-described style-of-rendition table and code book. Then, at step S2, waveform data are acquired which correspond to tones performed on various natural musical instruments with various styles of rendition. Namely, at this step S2, various performance tones actually produced on various natural musical instruments are acquired via an external waveform input device, such as a microphone, through the waveform input section 107, and waveform data of these performance tones (i.e., original waveform data) are stored into predetermined areas of the hard disk 109. At this time, the waveform data of either the entire performance or only part of the performance, such as a particular phrase, one particular tone or characteristic portions like attack and release portions of a particular tone, may be acquired and stored. At following step S3, the thus-acquired waveform data of each of the performance tones corresponding to the various performance styles unique to the natural musical instruments are segmented every characteristic portion, then subjected to a tuning operation and then given file names. Namely, the acquired original waveform data of each of the performance tones are segmented into partial waveforms (waveform segmentation), each representing a characteristic waveform shape variation, such as an attack-portion waveform, body-portion waveform, release-portion waveform and joint-portion waveform, the tuning operation is performed to determine the respective pitches of the individual segmented waveform data or partial waveforms covering one or two or more cycles of the tone in question, and then unique file names are imparted to the segmented waveform data. Note that in the case where only the waveform data of part of the performance, such as attack and release portions, are acquired, the above-mentioned waveform segmentation can be dispensed with.

Then, at step S4, the waveform data having been processed at step S3 are divided into waveform components through frequency analysis. Namely, each of the segmented partial waveforms is subjected to Fast Fourier Transform (FFT) for division into a plurality of waveform components (in the instant embodiment, harmonic and nonharmonic components). In addition, characteristics of various waveform factors, such as a waveform shape, pitch and amplitude, are extracted from each of the waveform components (harmonic and nonharmonic components); however, in the case where the each of the segmented partial waveforms is divided into the harmonic and nonharmonic components, the pitch extraction from the nonharmonic component may be omitted because the nonharmonic component has no pitch. For example, the "waveform shape" (timbre) factor represents extracted characteristics of a waveform shape normalized in pitch and amplitude, the "pitch" factor represents extracted characteristics of a pitch variation from a predetermined reference pitch, and the "amplitude" factor represents extracted characteristics of an amplitude envelope.

At next step S5, vector data are created. Namely, for each of the waveform shape (timbre), pitch and amplitude factors of the divided waveform components (e.g., harmonic and nonharmonic components), a plurality of sample values of successive sample points are extracted dispersedly or, if necessary, successively, and each extracted sample value group of successive sample points thus obtained is given a different or unique vector ID (identification information) and stored into the code book along with data indicative of a time position thereof. Hereinafter, such sample data are referred to as "vector data". The instant embodiment creates vector data of the waveform shape (timbre) factor, pitch factor and amplitude factor of each of the harmonic components, and vector data of the waveform shape (timbre) factor and amplitude factor of each of the nonharmonic components. The vector data of each of the waveform factors is data variable in accordance with the passage of time along the time axis. Then, as will be later described later, data of style-of-rendition modules are created to store the style-of-rendition modules into the style-of-rendition table. The thus-created style-of-rendition modules and vector data are written into the style-of-rendition table and code book in the database for data accumulation into the database, at step S6. As noted above, the vector data differ from the original waveform data as initially introduced into the waveform producing apparatus of the invention; these are the data obtained by dividing the introduced original waveform for each of the waveform factors. Each of the vector data is data that ultimately becomes a minimum constituent unit of a style-of-rendition module. Thus, in the code book, the extracted partial waveform data representing respective variations in the waveform shape are stored in compressed form. In the style-of-rendition table, on the other hand, data of various style-of-rendition modules are stored, such as various data necessary for converting the vector data, stored in compressed form, back to the waveform data of the original waveform shape and ID data for designating a desired one of the vector data stored in the code book, as will be later described in detail.

During the extraction of the characteristics of the various waveform factors at step S4, characteristics of a time factor are also extracted in addition to those of the above-mentioned amplitude, pitch and waveform shape factors. Hereinafter, thus-extracted vector data of the time factor will be referred to as "time vector data". The time length of part of the original waveform data, corresponding to the time section of the extracted partial waveform data, is used directly as the time factor. Thus, if the original time length (variable value) of the time section in question is represented by a ratio "1", then there is no need to analyze and measure the time length in this waveform database creation process. Because, in this case, the data of the time factor, i.e. time vector data, has the same value "1" in each of the time sections, the time length need not necessarily be stored in the code book. However, the present invention is, of course, not so limited and may be modified to analyze and measure the actual time length and store the thus-measured time length into the code book as the time vector data.

Then, at step S7 of FIG. 2, a determination is made as to whether the database creation has been executed to a sufficient degree, i.e. whether or not a sufficient quantity of style-of-rendition module data and vector data have been obtained by acquiring, via the external waveform input device, a sufficient quantity of original waveform data of tones performed on various natural musical instruments with various styles of rendition. The determination at step S7 is not necessarily limited to an automatic determination and may be made on the basis of a user's manual switch input operation giving an instruction as to whether the waveform database creation process should be continued or not. If the acquisition of the original waveform data and creation of the vector data based thereon has been executed to a sufficient degree (YES determination at step S7), the instant waveform database creation process is brought to an end. If, on the other hand, the acquisition of the original waveform data and creation of the vector data based thereon has not yet been executed to a sufficient degree and hence has to be executed further (NO determination at step S7), the waveform database creation process loops back to step S2 in order to repeat the above-described operations of steps S2–S7. The determination of step S7 as to whether the database creation has been executed to a sufficient degree may be made by actually using the created vector data to generate tones on a trial basis. Namely, after the sequence of the waveform database creation process of FIG. 2 is terminated by provisionally determining at step S7 that a sufficient quantity of vector data have been created, there may be performed an operation of actually using the created vector data to generate tones on a trial basis and then, if the thus-generated tones are found to be unsatisfactory as a result of the trial tone generation, repeating the operations at and after step S2 to create further vector data. Namely, in the instant embodiment, the operation of creating further vector data is performed on an as-needed basis.

It should be appreciated here that the above-described waveform database creation process may be arranged to add/delete any desired style-of-rendition module or edit the data of a desired style-of-rendition module.

Now, the following paragraphs describe the style-of-rendition module data in greater detail.

Each of the style-of-rendition modules is stored in the style-of-rendition table arranged as a database in the hard disk 109 and can be designated by a combination of "style-of-rendition ID" and "style-of-rendition parameters". The style-of-rendition ID contains musical instrument type information and module part name and can be defined, for example, as follows. Assuming that each style-of-rendition ID consists of 32 bits (0th–31st bits), six bits of the 32 bits are use for the musical instrument type information. In the instant embodiment, for example, if the six-bit train constituting the musical instrument type information is "000000", it is indicative of "AltoSax" (an alto saxhorn), and if the six-bit train constituting the musical instrument type information is "001000", it is indicative of "Violin" (a violin); note that the upper three bits of the six-bit train may be used to represent a major class of the musical instrument while the lower three bits may be used to represent a minor class of the musical instrument. Further, other six bits of the 32 bits are used for the module part name. If the six-bit train constituting the module part name is "000000", it is indicative of a module part name "NormalAttack", if the six-bit train is "000001", it is indicative of "BendAttack", if the six-bit train is "000010", it is indicative of "GraceNoteAttack", if the six-bit train is "001000", it is indicative of "NormalShortBody", if the six-bit train is "001001", it is indicative of "VibBody", if the six-bit train is "001010", it is indicative of "NormalLongBody", if the six-bit train is "010000", it is indicative of "NormalRelease", if the six-bit train is "011000", it is indicative of "NormalJoint" and if the six-bit train is "011001", it is indicative of "GraceNoteJoint". Of course, the present invention is not limited to the above-noted arrangements.

As stated above, each individual style-of-rendition module is specified by a combination of the "style-of-rendition ID" and "style-of-rendition parameters"; that is, a predetermined style-of-rendition module can be specified in accordance with the style-of-rendition ID and its contents can be variably controlled in accordance with the style-of-rendition parameters. The style-of-rendition parameters are parameters for characterizing or controlling the waveform data corresponding to the style-of-rendition module, and predetermined sorts of style-of-rendition parameters are provided for each style-of-rendition module. For example, for the "AltoSax[NormalAttack]" module, there may be provided style-of-rendition parameters pertaining to an absolute tone pitch and tone volume immediately following the attack, etc. For the "AltoSax[BendUpAttack]" module, there may be provided style-of-rendition parameters pertaining to an absolute tone pitch at the end of the bendup attack, initial value of a bend depth at the time of the bendup attack, time length from the start (note-on timing) to end of the bendup attack, tone volume immediately following the attack, time-wise stretch/contraction of a default curve during the bendup attack, etc. For the "AltoSax[NormalShortBody]" module, there may be provided style-of-rendition parameters pertaining to an absolute tone pitch of the style-of-rendition module, end and start times of the normal short body, dynamics at the start and end of the normal short body, etc. Note that the style-of-rendition module does not necessarily include data (later-described waveform factor data) corresponding to all the values which the style-of-rendition parameters can take; the style-of-rendition module may include data corresponding to only some discrete (non-successive) values of the style-of-rendition parameters. That is, for the "AltoSax[NormalAttack]" module, for example, there may be stored data corresponding to only some, not all, of the values representative of the absolute tone pitch and tone volume immediately following the attack.

By thus allowing each style-of-rendition module to be specified by a combination of the style-of-rendition ID and style-of-rendition parameters, it is possible to designate data corresponding to a desired set of style-of-rendition parameters from among a plurality of data (waveform factor data) indicative of the normal attack portion of an alto saxophone tone, for example, in the case of the "AltoSax [NormalAttack]" module. In the case of the "Violin [BendAttack]" module, it is possible to designate data corresponding to a desired set of style-of-rendition parameters from among a plurality of data (waveform factor data) indicative of the bend attack portion of a violin tone.

In the style-of-rendition table, there are stored, for each individual style-of-rendition module, data necessary for producing a waveform corresponding to the style-of-rendition module, such as vector IDs designating the vector data of the individual waveform factors (e.g., the waveform shape factor, pitch factor (pitch envelope) and amplitude factor (amplitude envelope)), train of values at representative points (i.e., data indicative of representative sample points to be modified in a train of a plurality of samples), and respective starting and ending time positions of the vector data of the individual waveform factors (e.g., the waveform shape factor, pitch factor (pitch envelope) and amplitude factor (amplitude envelope)). Namely, in the style-of-rendition table, there are stored various data necessary for reproducing a waveform of a normal shape from a waveform stored in the database in the form of compressed vector data; hereinafter, such data will also be called "waveform factor data". The following explain details of one of the data groups stored in the style-of-rendition table in association with various style-of-rendition modules, and more particularly is explanatory of the data group stored for the AloSax [NormalAttack] module:

Data 1: Sampled length of the style-of-rendition module;

Data 2: Position of note-on timing;

Data 3: Vector ID of the amplitude factor of the harmonic component and train of the representative point values;

Data 4: Vector ID of the pitch factor of the harmonic component and train of the representative point values;

Data 5: Vector ID of the waveform shape (timbre) factor of the harmonic component;

Data 6: Vector ID of the amplitude factor of the nonharmonic component and train of the representative point values;

Data 7: Vector ID of the waveform shape (timbre) factor of the nonharmonic component;

Data 8: Start position of a waveform block of the waveform shape (timbre) factor of the harmonic component;

Data 9: End position of a waveform block of the waveform shape (timbre) factor of the harmonic component (i.e., start position of a loop portion of the waveform shape (timbre) factor of the harmonic component);

Data 10: Start position of a waveform block of the waveform shape (timbre) factor of the nonharmonic component;

Data 11: End position of a waveform block of the waveform shape (timbre) factor of the nonharmonic component; (i.e., start position of a loop portion of the waveform shape (timbre) factor of the nonharmonic component): and Data 12: End position of a loop portion of the waveform shape (timbre) factor of the nonharmonic component.

Data 1–Data 12 mentioned above will be described below in greater detail with reference to FIG. 3.

Figure 3:
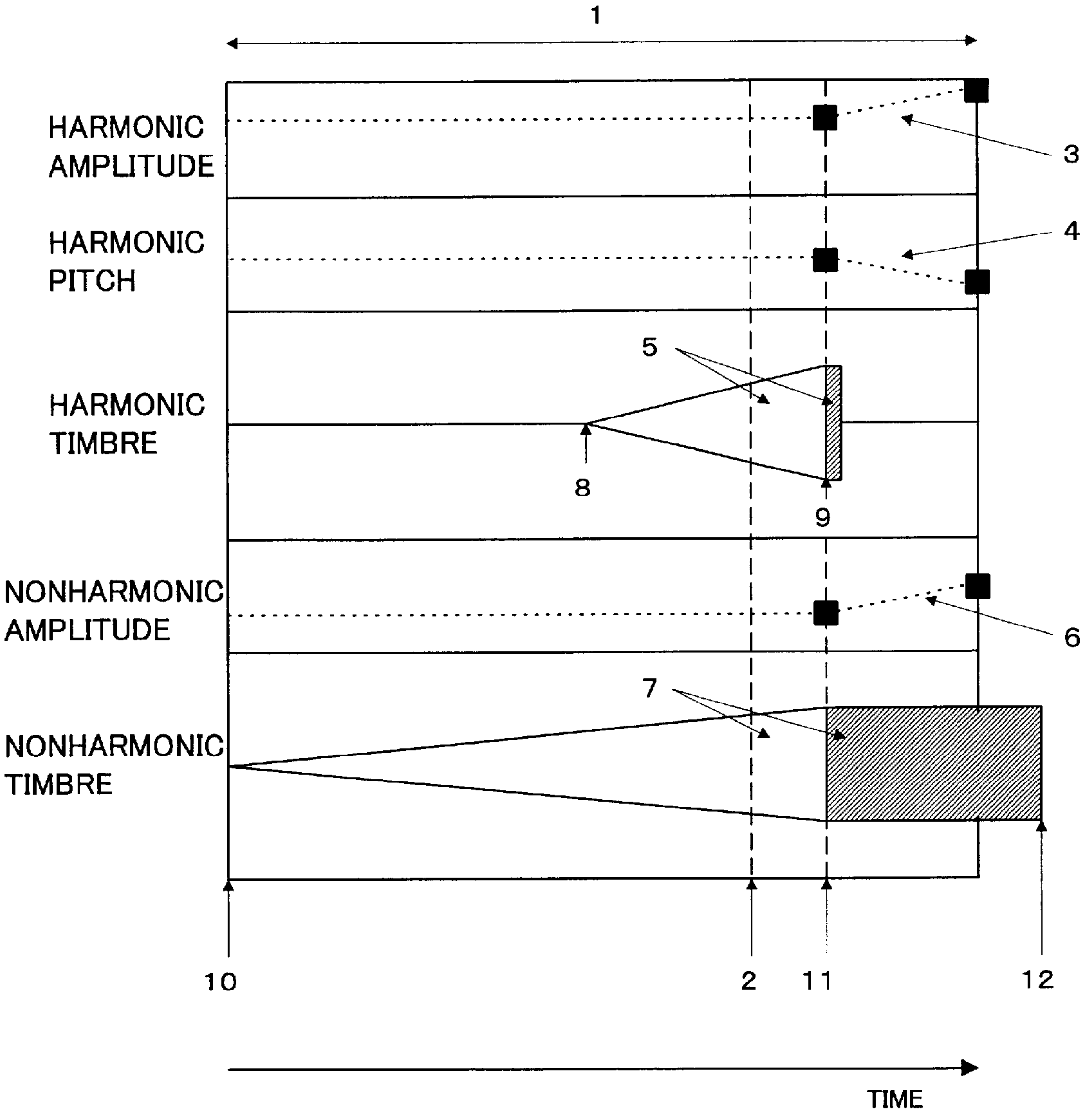
FIG. 3 is a diagram schematically illustrating various waveform components and factors constituting an actual waveform segment corresponding to a style-of-rendition module.

FIG. 3 is a diagram schematically illustrating various waveform components and waveform factors constituting an actual waveform section corresponding to the style-of-rendition module in question. From the top to bottom of FIG. 3, there are shown the amplitude factor, pitch factor and waveform shape (timbre) factor of the harmonic component, and the amplitude factor and waveform shape (timbre) factor of the nonharmonic component which have been detected in the waveform section. Note that numeral values represent the respective numbers of the above-mentioned data (Data 1–Data 12).

More specifically, numerical value 1 represents the sampled length of the waveform section (length of the waveform section) corresponding to the style-of-rendition module, which corresponds, for example, to the total time length of the original waveform data from which the style-of-rendition module is derived. Numerical value 2 represents the position of the note-on timing, which can be variably set at any time position of the style-of-rendition module. Although, in principle, sounding of the performance tone based on the waveform is initiated at the position of the note-on timing, the rise start point of the waveform component may precede the note-on timing in the case of a particular style of rendition such as a bend attack. Numerical value 3 represents the vector ID designating the vector data of the amplitude factor of the harmonic component and train of the representative point values stored in the code book; in the figure, two square marks filled in with black indicate these representative points. Numerical value 4 represents the vector ID designating the vector data of the pitch factor of the harmonic component and train of the representative point values. Numerical value 6 represents the vector ID designating the vector data of the amplitude factor of the nonharmonic component and train of the representative point values. The representative point values are data to be used for changing/controlling the vector data, made up of a train of a plurality of samples, designated by the vector ID, and designates some of the representative sample points. As the respective time positions (plotted on the horizontal axis of the figure) and levels (plotted on the vertical axis of the figure) of the designated representative sample points are changed or controlled, the other sample points are also changed so that the overall shape of the vector can be changed. For example, the representative point values represent discrete samples fewer than the total number of the samples; however, the representative point values may be values at intermediate points between the samples or values at a plurality of successive samples over a predetermined range. Alternatively, the representative point values may be such values indicative of differences between the sample values, multipliers to be applied to the sample values or the like, rather than the sample values themselves. The shape of each vector data, i.e. shape of the envelope waveform, can be changed by moving the representative points along the horizontal axis (time axis) and/or vertical axis (level axis). Numerical value 5 represents the vector ID designating the vector data of the waveform shape (timbre) factor of the harmonic component.

Further, in FIG. 3, numerical value 7 represents the vector ID designating the vector data of the waveform shape (timbre) factor of the nonharmonic component. Numerical value 8 represents the start position of the waveform block of the waveform shape (timbre) factor of the harmonic component. Numerical value 9 represents the end position of the waveform block of the waveform shape (timbre) factor of the harmonic component (i.e., the start position of the loop portion of the waveform shape (timbre) factor of the harmonic component). Namely, the triangle starting at a point denoted by "8" represents a nonloop waveform segment where characteristic waveform shapes are stored in succession, and the following rectangle starting at a point denoted by "9" represents a loop waveform segment. The nonloop waveform segment represents a high-quality waveform segment that is characteristic of the style of rendition (articulation) etc. while the loop waveform segment represents a unit waveform of a relatively monotonous tone segment having a single or an appropriate plurality of wave cycles. Numerical value 10 represents the start position of the waveform block of the waveform shape (timbre) factor of the nonharmonic component. Numerical value 11 represents the end position of the waveform block of the waveform shape (timbre) factor in the nonharmonic component (i.e., the start position of the loop portion of the waveform shape (timbre) factor of the nonharmonic component). Further, numerical value 12 represents the end position of the loop waveform segment of the waveform shape (timbre) factor in the nonharmonic component. Data 3–Data 7 are ID data indicating the vector data stored in the code book for the individual waveform factors, and Data 2 and Data 8–Data 12 are time data for restoring the original waveform (i.e., the waveform before the waveform segmentation) on the basis of the vector data. Namely, the data of each of the style-of-rendition modules comprise the data designating the vector data and time data. Using such style-of-rendition module data stored in the style-of-rendition table and the waveform producing materials (i.e., vector data), any desired waveform can be constructed freely. Namely, each of the style-of-rendition modules comprises data representing behavior of a waveform to be produced in accordance with a style of rendition or articulation. Note that the style-of-rendition modules may differ from each other in the sort and number of the data included therein and may include other data than the above-mentioned. For example, the style-of-rendition modules may include data to be used for controlling the time axis of the waveform for stretch/contraction thereof (time-axial stretch/compression control).

Whereas the preceding paragraphs have described the case where each of the style-of-rendition modules includes all of the fundamental waveform factors (waveform shape, pitch and amplitude factors) of the harmonic component and the fundamental waveform factors (waveform shape and amplitude factors) of the nonharmonic component, the present invention is not so limited, and each or some of the style-of-rendition modules may, of course, include only one of the waveform factors (waveform shape, pitch and amplitude) of the harmonic component and the waveform factors (waveform shape and amplitude) of the nonharmonic component. For example, each or some of the style-of-redition modules may include a selected one or more of the waveform shape, pitch and amplitude factors of the harmonic component and waveform shape and amplitude factors of the nonharmonic component. In this way, the style-of-redition modules can be used freely in any desired combination depending on the waveform factor desired, which is very preferable.

With the above-described arrangement that only waveform data of partial waveforms necessary for waveform shape variations (such as partial waveforms of attack, body, release, joint portions), rather than all waveform data, of tones performed on various natural musical instruments with various performance styles are extracted and stored into the hard disk 109 in a form compressed with the data compression scheme using a hierarchy of the waveform components, waveform factors and representative points, the instant embodiment can effectively reduce a necessary storage capacity of the hard disk 109 for storing the waveform data.

Figure 4A:
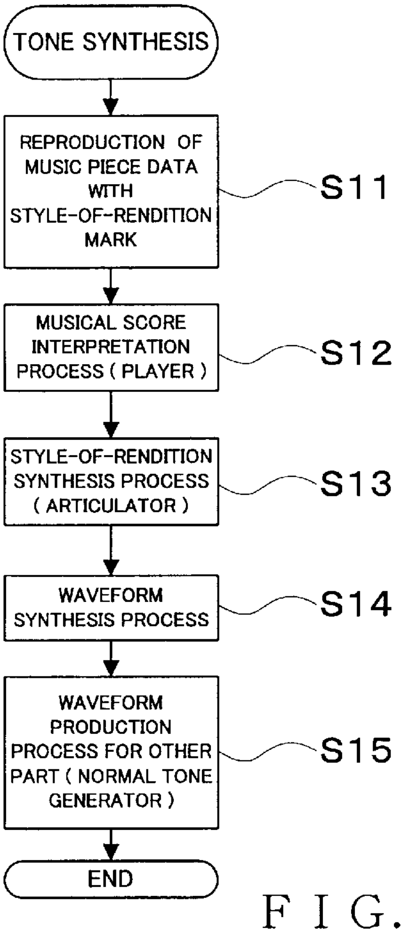
FIG. 4A is a flow chart showing an exemplary operational sequence of a database-based tone synthesis process.
Figure 4B:
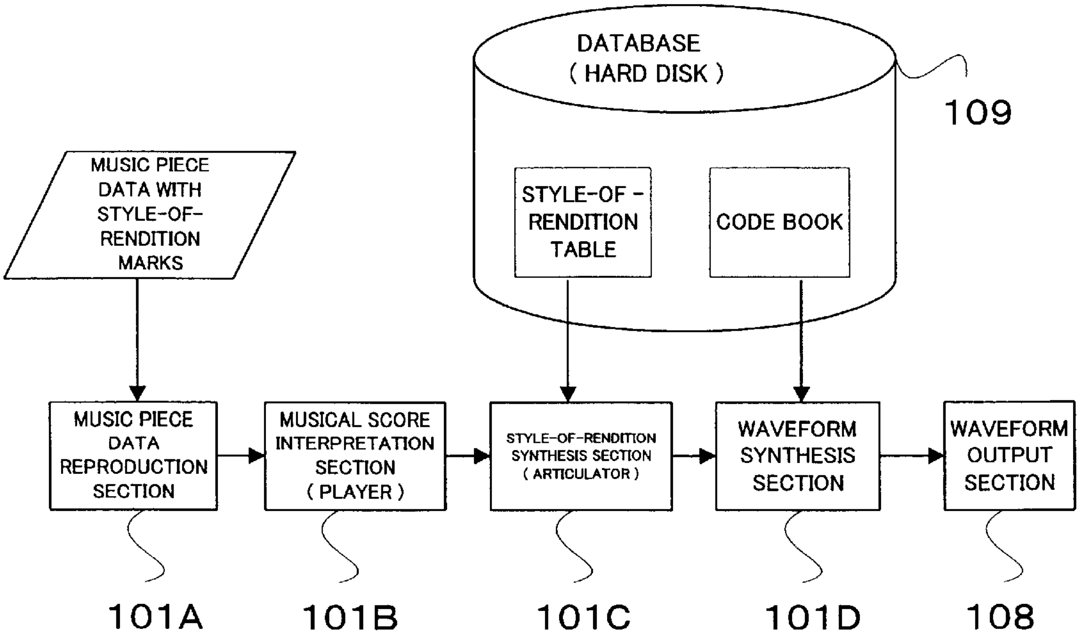
FIG. 4B is a block diagram showing an example of a dedicated hardware apparatus constructed to carry out a tone synthesis process similar to that of FIG. 4A.

In the waveform producing apparatus shown in FIG. 1, waveform synthesis is performed by the computer executing a predetermined software program for the waveform synthesis process. FIG. 4A is a flow chart showing an exemplary operational sequence of the program for the waveform synthesis process (database-based tone synthesis process). In an alternative, the waveform synthesis process may be executed by a dedicated hardware apparatus rather than the waveform synthesis program. FIG. 4B is a block diagram showing an example of such a dedicated hardware apparatus for carrying out the waveform synthesis process. The waveform synthesis process will be described below with primary reference to the block diagram of FIG. 4B where corresponding steps of FIG. 4A are noted in parentheses in the following description; in FIG. 4A, hardware components corresponding to operational steps are denoted in parentheses.

Music-piece-data reproduction section 101A of FIG. 4B reproduces music piece data with style-of-rendition marks (step S11 of FIG. 4A). For this purpose, the music-piece-data reproduction section 101A receives the music piece data with style-of-rendition marks (performance information). Generally, on a normal musical score or chart, there are put various musical marks, such as a dynamic marking (crescendo, decrescendo or the like), tempo mark (allegro, ritardando or the like), slur mark, tenuto mark and accent mark, which can not be MIDI data in the absence of proper conversion. Thus, these musical marks are converted into style-of-rendition mark data, and MIDI music piece data with these style-of-rendition mark data are provided as the "music piece data with style-of-redition marks". Each of the style-of-rendition mark data includes a chart ID and chart parameters. The chart ID is an ID indicative of the musical mark put on the musical score, and the chart parameters are indicative of a degree of the particular rendition represented by the musical mark that is designated by the chart ID. For example, in the case where the chart ID designates a "vibrato", a speed, depth, etc. of the vibrato are given as the chart parameters, and in the case where the chart ID designates a "crescendo", tones volume levels at the start and end of the crescendo, length of a time period over which the tone volume varies, etc. are given as the chart parameters.

Further, in FIG. 4B, a musical score interpretation section (player) 101B carries out a musical score interpretation process (step S12). Specifically, the MIDI data and style-of-rendition mark data (each including the chart ID and chart parameters) contained in the music piece data are converted into style-of-rendition designating information including style-of-rendition IDs and style-of-redition parameters, which is then sent to a style-of-redition synthesis section (articulator) 101C along with time information. Generally, even a same musical mark may be interpreted differently between different human players so that the performance is executed in a different manner (i.e., with a different style of rendition or articulation) for each of the human players. Further, depending on an arrangement of notes or the like, the performance may be executed in a different manner for each of the human players. So, the musical score interpretation section 101B is provided here as a result of converting expertise for interpreting the marks (musical marks and arrangement of notes) on the musical score into an expert system. The following are among various criterion for the musical score interpretation section 101B to interpret the marks on the musical score. For example, a vibrato can not be applied to a note shorter than an eighth note. With a staccato, dynamics increase spontaneously. Attenuation rate of a note depends on a degree of a tenuto. Legato does not cause attenuation in a tone. Speed of a vibrato of an eighth note is substantially determined by a time value. Dynamics depend on a tone pitch. Further, various other interpretation criterion are employed, which, for example, pertain to a variation in dynamics due to a tone pitch rise and fall within a phrase, attenuation dynamics linearly proportional to a sound intensity (decibel), a variation in note length responsive to a tenuto, staccato or the like, and a bendup width and curve responsive to a bendup mark in an attack portion. The musical score interpretation section 101B converts the musical score into sounds by interpreting the musical score in accordance with these interpretation criterion. Further, the musical score interpretation section 101B also carries out the musical score interpretation process in accordance with player designation by the user, i.e. user's designation of a desired human player (style of rendition). Specifically, the musical score interpretation section 101B interprets the musical score in accordance with a given mode corresponding to the designated player or style of rendition, i.e. in a different manner for each designated player or style of rendition. For example, various different modes of interpreting a musical score corresponding to a plurality of human players are stored in the database so that the musical score interpretation section 101B interprets the musical score using a selected one of the stored musical score interpreting modes which corresponds to the user-designated player.

It should be appreciated here that the music piece data (performance information) may be constructed to include, in advance, data indicative of interpreted results of the musical score. Of course, if such music piece data including the data indicative of interpreted results have been input to the apparatus, the above-described musical score interpretation process need not be performed. Further, the musical score interpretation process may be performed by the interpretation section 101B in a fully automatic fashion or with intervention of some user's manual input operations as appropriate.

By referring to the style-of-rendition table on the basis of the converted style-of-rendition designating information (style-of-rendition IDs and parameters) from the interpretation section 101B, the style-of-rendition synthesis section (articulator) 101C creates a packet stream (also called a vector stream) corresponding to the style-of-rendition designating information and vector parameters for the packet stream corresponding to the style-of-rendition parameters, and supplies the thus-created packet stream and vector parameters to a waveform synthesis section 101D (step S13). The data supplied as the packet stream to the waveform synthesis section 101D include time information, vector IDs, representative point values, etc. of the packets in the case of the pitch and amplitude factors, and vector IDs, time information, etc. in the case of the waveform shape (timbre) factor, as will be later described in detail.

Then, the waveform synthesis section 101D retrieves the vector data from the code book in accordance with the supplied packet stream, changes or modifies the retrieved vector data in accordance with the vector parameters, and synthesizes a waveform on the basis of the thus-changed vector data (step S14). After that, the waveform synthesis section 101D carries out a waveform production process for another performance part (step S15). Here, the "other performance part" means any one of a plurality of performance parts which is not subjected to the style-of-redition synthesis process but is subjected to a normal tone waveform synthesis process. For the other performance part, the tone generation is performed using the conventional waveform-memory-based tone generator scheme. The waveform production process for the other performance part may be performed by a dedicated hardware tone generator, such as an external tone generator unit or tone generator card detachably attachable to a computer. For simplicity of description, however, it is assumed here that the instant embodiment performs the tone generation corresponding to styles of rendition or articulation only for one performance part, although the style-of-rendition reproduction may of course be performed for a plurality of performance parts.

Figure 5:
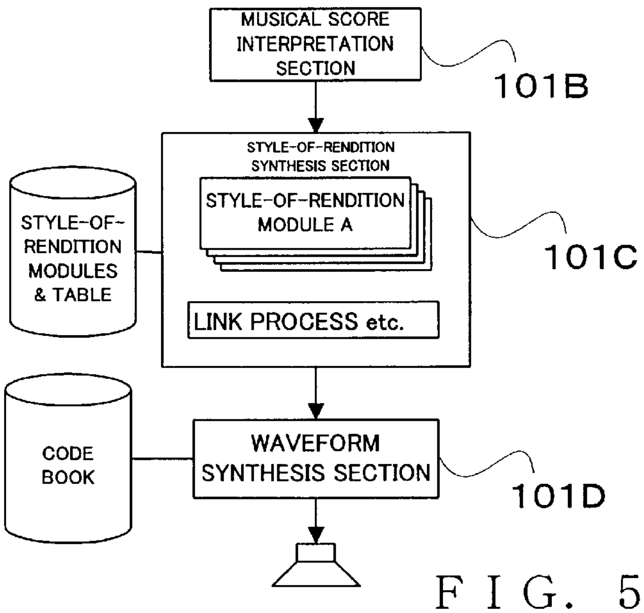
FIG. 5 is a flow chart showing an exemplary operational sequence of a style-of-rendition synthesis process performed by a style-of-rendition synthesis section shown in FIG. 4B.

FIG. 5 is a flow chart showing an exemplary operational sequence of the style-of-rendition synthesis process performed by the above-mentioned style-of-rendition synthesis section 101C of FIG. 4B. Although the style-of-redition modules and code book are shown as separately stored in FIG. 5, they are, in fact, stored together in the database of the hard disk 109.

The style-of-rendition synthesis section 101C creates various packet streams to be supplied to the waveform synthesis section 101D, on the basis of the style-of-redition designating information (including the style-of-redition IDs and style-of-rendition parameters) and time information given from the musical score interpretation section 101B. The style-of-rendition modules employed in the style-of-rendition synthesis section 101C for the individual tone colors are not necessarily fixed; rather, the user can add any new style-of-rendition module to the currently-stored modules and stop using any of the currently-stored modules. Also, the style-of-rendition synthesis section 101C performs a process for creating information to compensate for a difference or discrepancy between selected waveform factor data and values of the style-of-rendition parameters, as well as a process for smoothing a connection between waveform characteristics of successive style-of-rendition modules, as will be later described in detail.

Whereas, in principle, the data are given from the musical score interpretation section 101B to the style-of-redition synthesis section 101C, the present invention is not so limited. Namely, there may be prepared music piece data with style-of-rendition designating data already interpreted by the interpretation section 101B as noted earlier, or music piece data with style-of-rendition designating data having style-of-rendition IDs and style-of-redition parameters imparted thereto as a result of musical score interpretation by a human operator. Then, the data obtained by reproducing the thus-prepared music piece data may be supplied to the style-of-rendition synthesis section 101C.

Figure 6:
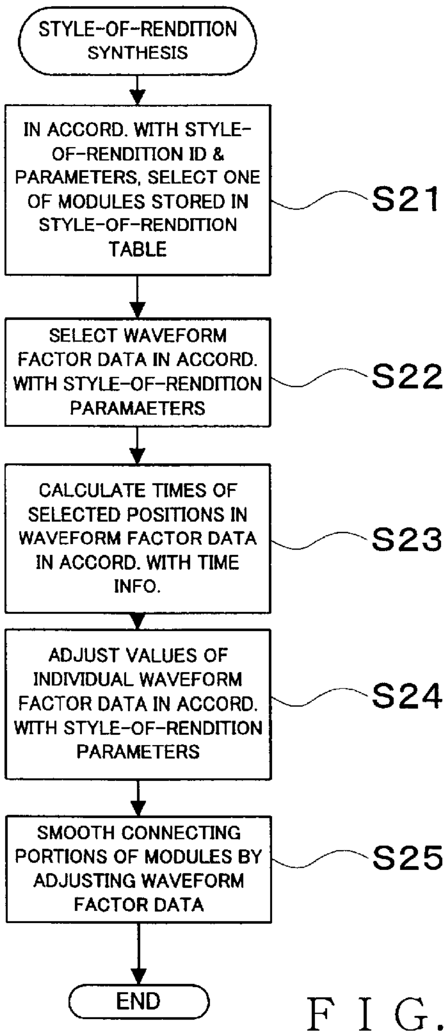
FIG. 6 is a flow chart showing in greater detail the style-of-rendition synthesis process performed by the style-of-rendition synthesis section.

FIG. 6 is a flow chart showing an exemplary operational sequence of the style-of-rendition synthesis process.

The style-of-rendition synthesis section 101C selects one of the style-of-rendition modules stored in the style-of-rendition table in accordance with the style-of-rendition ID and style-of-rendition parameters, at step S21; that is, one of the style-of-rendition modules is selected in accordance with the style-of-rendition ID (musical instrument type information plus module part name) and style-of-rendition parameters sent from the musical score interpretation section 101B. At this time, the musical score interpretation section 101B, before proceeding to the interpretation of the musical score, checks the database to see what sorts of module parts are currently stored in the style-of-rendition table in correspondence with the tone color represented by the musical instrument type information and designates the style-of-rendition ID within the bounds of the currently-stored module parts. In case a module part not currently stored in the style-of-redition table has been designated, then another module part having similar characteristics to the designated module part may be selected from the style-of-rendition table. After that, a plurality of waveform factor data are selected in accordance with the designated style-of-redition ID and style-of-rendition parameters at step S22. Namely, a particular style-of-rendition module is specified by referring to the style-of-rendition table on the basis of the designated style-of-rendition ID and style-of-redition parameters, and a plurality of waveform factor data corresponding to the style-of-rendition parameters are selected from the style-of-rendition module. In the event that the style-of-rendition module does not include waveform factor data fully matching the style-of-rendition parameters, other waveform factor data sufficiently close to the values of the style-of-rendition parameters are selected.

Then, at step S23, time values of selected positions in the waveform factor data are calculated in accordance with the time information; that is, the individual waveform factor data are arranged at their respective absolute time positions on the basis of the time information. More specifically, corresponding absolute times of the individual waveform factor data presenting respective relative time positions are calculated on the basis of the time information. This way, respective timing of the waveform factor data is determined (see FIG. 3). Then, at step S24, values of the individual waveform factor data are adjusted in accordance with the style-of-rendition parameters; that is, differences between the selected waveform factor data and the values of the style-of-redition parameters are compensated for at this step. For example, if the tone volume (style-of-rendition parameter) immediately following the attack portion of the AltoSax[NormalAttack] module, received from the musical score interpretation section 101B, is at a level "95" while the tone volume immediately following the attack portion of the AltoSax[NormalAttack] module stored in the style-of-redition is at a level "100", then the style-of-rendition synthesis section 101C selects the waveform factor data of the latter AltoSax[NormalAttack] module whose tone volume level immediately following the attack portion is "100". However, because the tone volume level immediately following the attack portion is still "100", adjustments are made to the representative points of the selected waveform factor data so as to modify the tone volume level immediately following the attack portion to "95". This way, the values of the selected waveform factor data are adjusted to approach the values of the received style-of-redition parameters. Further, at this step, there is made an adjustment according to a currently-set microtuning value for tuning of the musical instrument, as well as a tone volume adjustment according to tone volume variation characteristics of the musical instrument. These adjustments are performed by changing, sometimes greatly, the representative point values of the individual waveform factor data. Namely, the representative point values are necessary and sufficient data for the adjustments, and various adjustments are made by controlling the representative point values in the waveform factor data.

Note that at step S23 above, the time positions indicated by the time information may be adjusted by adjustment information such as the above-mentioned style-of-redition parameters. For example, in a situation where a time position based on the performance data and a time position indicated by the time information do not coincide with each other, other time information indicative of another time position close to the time position based on the performance data may be selected and the time position indicated by the thus-selected time information may be adjusted in accordance with the performance data so that the time position information intended by the performance data can be obtained. Further, in a situation where the performance data includes variable control factors such as a touch and velocity, time position information based on the performance data can be variably controlled by changing the time position information in accordance with the variable control factors. The above-mentioned adjustment information include information for effecting such a time position adjustment.

Further, at next step S25, a waveform linking process is performed for smoothing respective connecting portions of adjoining style-of-rendition modules by adjusting the individual waveform factor data. Namely, the representative points of the respective connecting portions of the adjoining style-of-rendition modules are brought closer and linked with each other, so as to smooth the waveform characteristics of the adjoining style-of-rendition modules. Such a connection or waveform linking process is carried out for each of the waveform factors, such as the waveform shape (timbre), amplitude and pitch of the harmonic component, or for each of the waveform factors, such as the waveform (Timbre) and amplitude of the nonharmonic component.

At that time, adjustments are made over a range from a link starting point of the preceding style-of-rendition module to a linking end point of the succeeding style-of-redition module. More specifically, the representative points within the range from the link starting point to the linking end point are adjusted on the basis of a "mutual approaching rate". Here, the "mutual approaching rate" is a parameter for performing control to determine a point displaced from each of the preceding and succeeding style-of-rendition modules toward the other where the adjoining style-of-rendition modules are to be interlinked, and this parameter is set in accordance with a combination of the adjoining style-of-rendition modules. In case the adjoining style-of-rendition modules have not been interlinked successfully, the connection is smoothed by thinning out the vector IDs of the waveform characteristics of one of the adjoining style-of-rendition modules. For the thinning-out of the vector IDs, there are provided, in the instant embodiment, a "style-of-rendition module combination table", "thinning-out parameter range table" to be referred to from the style-of-rendition module combination table, and a "thinning-out time table" to be referred to from the thinning-out parameter range table.

The waveform characteristics can also be interlinked smoothly through a waveform linking process performed by the musical score interpretation section 101B as follows, in place of or in addition to the above-described waveform linking process performed by the style-of-rendition synthesis section 101C. For example, discrete regions of the style-of-rendition parameters (values of the dynamics, pitch parameter, etc.) are linked together smoothly without regard to the style-of-rendition modules. In shifting from a vibrato to a release portion, for example, the waveform characteristics may be linked smoothly by decreasing the vibrato effect earlier.

Now, the above-described waveform linking process, i.e. adjustments of the individual waveform factor data for smoothing respective connecting portions of adjoining style-of-rendition modules (see step S25), will be described in more details. First, with reference to FIG. 7, a description is made about the waveform linking process in relation to a case where the style-of-rendition modules each corresponds to the amplitude or pitch factor.

Figure 7:
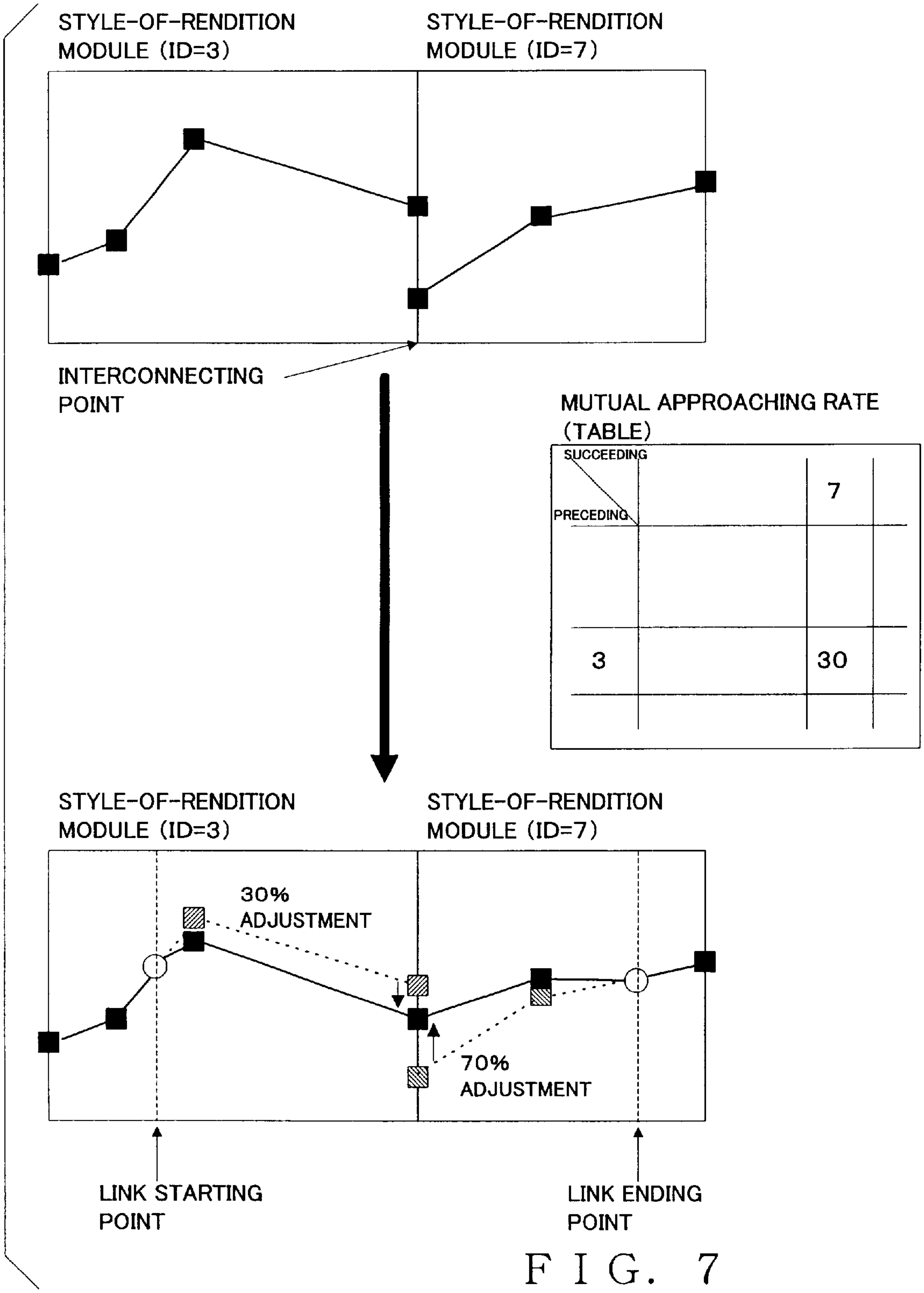
FIG. 7 is a flow chart showing an exemplary operational sequence of a waveform linking process in relation to a case where the style-of-rendition modules each corresponds to an amplitude or pitch factor.

When there is produced a great value difference at a waveform-interconnecting point between the adjoining style-of-rendition modules due to discreteness between the representative point values in the respective connecting portions of the two style-of-rendition modules, a "mutual approaching rate" is first determined as an index indicating to which one of the values of the preceding and succeeding style-of-rendition modules the target value of the dynamics connecting point or pitch connecting point should be brought closer. Let it be assumed here that in the instant embodiment, such a mutual approaching rate is given by a table as illustrated in FIG. 7. For example, if the vector ID of the preceding style-of-rendition module is "3" and the vector ID of the succeeding style-of-redition module is "7", then a mutual approaching rate of "30" is determined via the table. Then, the envelope shapes of the style-of-rendition modules are modified progressively from the link starting point of the preceding style-of-rendition module up to the linking end point of the succeeding style-of-rendition module, so as to approach the respective target values. Also, the envelope shapes of the style-of-rendition modules are modified progressively in the reverse direction, i.e. from the linking end point of the succeeding style-of-rendition module to the link starting point of the preceding style-of-rendition module. More specifically, if the mutual approaching rate has been set as "30", then the target value for the preceding style-of-rendition module is "30" so that the preceding style-of-rendition module is adjusted to be closer to the succeeding style-of-rendition module by 30%; in the instant embodiment, the last one of the representative points in the preceding style-of-rendition module is brought downward by 30%. At the same time, the succeeding style-of-redition module is adjusted to be closer to the preceding style-of-rendition module by 70 (i.e., 100–30)%; in the instant embodiment, the leading one of the representative points in the succeeding style-of-rendition module is brought upward by 70%. Also, in accordance with the above-mentioned adjustments of the leading and last representative points, a plurality of other representative points of the adjoining style-of-rendition modules intervening between the link starting and ending points are adjusted upward and downward to approach the respective target values. As set out above, the mutual approaching is effected at a plurality of representative points of the preceding and succeeding style-of-rendition modules. Note that although the above-mentioned link starting and ending points may be set as desired, it is desirable to set these link starting and ending points to coincide exactly with desired ones of the representative points in that undesirable bends of the envelope shape occurring at the link starting and ending points as illustrated in the figure can be avoided. It should also be obvious that even where the link starting and ending points are not set to coincide with the desired representative points, the mutual approaching may be performed in such a manner as to avoid the undesirable bends of the envelope shape.

It should also be appreciated that the mutual approaching rate may be determined in any other manner than the above-mentioned. For example, the mutual approaching rate may be determined on the basis of the style-of-redition parameters designated before and after the waveform-interconnecting point, or performance data before being converted into the style-of-rendition ID and parameters, or a combination of these data. Further, whereas the instant embodiment has been described above in relation to the case where only one representative point is adjusted in accordance with the mutual approaching rate and other representative points are adjusted by appropriate amounts in response to the adjustment of the one representative point, the embodiment may be modified such that a separate mutual approaching rate is determined for each of the plurality of representative points so that each of the representative points is adjusted by an amount as specified by the separate approaching rate.

Figure 8A:
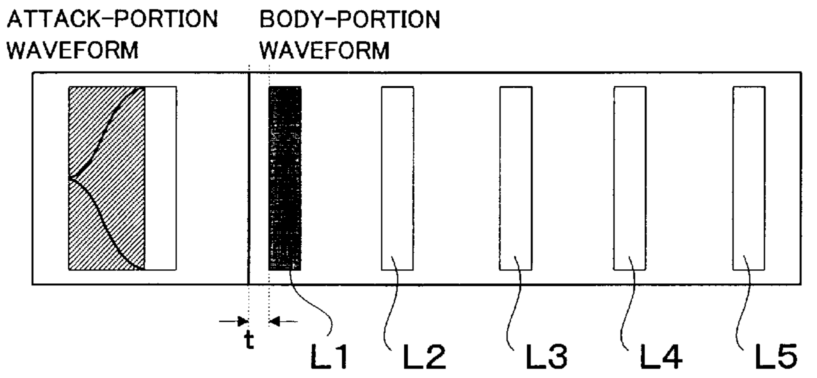
FIG. 8A is a conceptual diagram explanatory of a waveform thinning-out operation performed when an attack-portion waveform and a body-portion waveform are interconnected.
Figure 8B:
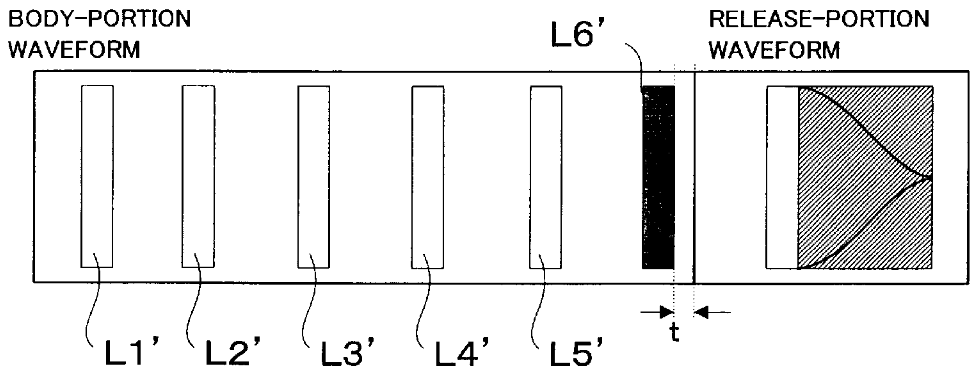
FIG. 8B is a conceptual diagram explanatory of a waveform thinning-out operation performed when a body-portion waveform and a release-portion waveform are interconnected.

Next, a description is made about the waveform linking process in relation to a case where the style-of-rendition modules each corresponds to the waveform (timbre) factor, with reference to FIGS. 8A–8D. Specifically, FIG. 8A is a conceptual diagram explanatory of a waveform thinning-out operation performed when an attack-portion waveform and a body-portion waveform are interconnected, and FIG. 8B is a conceptual diagram explanatory of a waveform thinning-out operation performed when a body-portion waveform and a release-portion waveform are interconnected. In the illustrated example of FIG. 8A, the body-portion waveform consists of five loop waveform segments L1–L5, each of which is reproduced in a repeated or looped fashion. Similarly, in the illustrated example of FIG. 8B, the body-portion waveform consists of six loop waveform segments L1'–L6'.

There are a variety of schemes to adjust the waveform factor data (namely, schemes to perform the waveform linking process). As one example, the assignee of the present patent application proposes a scheme which permits a smooth connection, for example, between a style-of-redition module of an attack or joint portion and a style-of-rendition module of a body portion (or between a style-of-rendition module of a body portion and a style-of-redition module of a release or joint portion), by partially thinning out the waveforms. It is well known to use cross-fade synthesis in interconnecting waveforms. However, where there is only a short time t between the waveform-interconnecting point and the start point of the first loop waveform segment L1 as in the illustrated example of FIG. 8A, there arises a need to perform rapid cross-fade synthesis within such short time period t. If such rapid cross-fade waveform synthesis is performed within the very short time period between the adjoining waveforms to be interconnected, there would be produced a waveform with undesirable great noise. Thus, the instant embodiment of the invention is arranged to thin out (delete) part of the waveforms to thereby widen the time interval between the two waveforms to be interconnected. Because the waveforms of the attack, release and joint portions are each a single integral block incapable of being thinned out, the instant embodiment thins out a selected one of the loop waveform segments of the body portion; the leading loop waveform segment L1 is thinned out in the example of FIG. 8A and the last loop waveform segment L6' is thinned out in the example of FIG. 8B, as denoted by rectangular marks filled in with black. For example, in the example of FIG. 8A, cross-fade synthesis is performed between the second loop waveform segment L2 having a relatively long time interval from the waveform-interconnecting point and the trailing waveform segment of the attack portion, and the leading loop waveform segment L1 is not used for the cross-fade synthesis. Similarly, in the example of FIG. 8B, cross-fade synthesis is performed between the fifth loop waveform segment L5' having a relatively long time interval from the waveform-interconnecting point and the release-portion waveform, and the sixth loop waveform segment L6' is not used for the cross-fade synthesis.

Note that the joint portion as referred to herein is a waveform section for interconnecting adjoining tones (or tone segments) through a desired style of rendition.

Figure 8C:
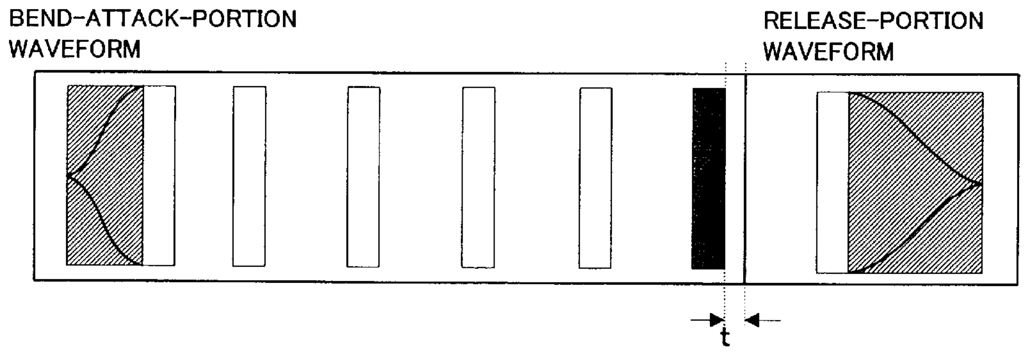
FIG. 8C is a conceptual diagram explanatory of a waveform thinning-out operation performed when a bend-attack-portion waveform and a release-portion waveform are interconnected.
Figure 8D:
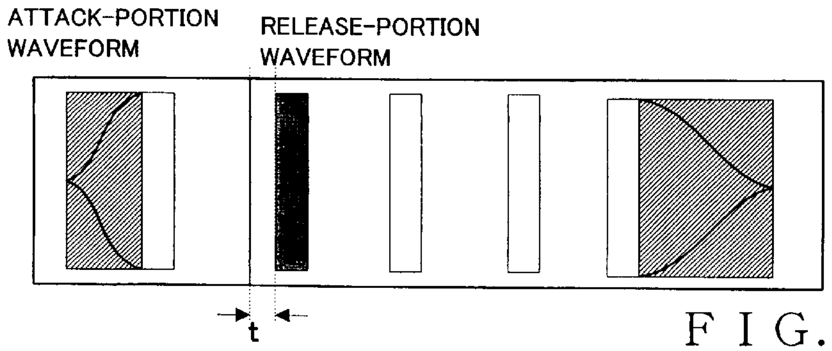
FIG. 8D is a conceptual diagram explanatory of a waveform thinning-out operation performed when a normal-attack-portion waveform and a release-portion waveform having a loop waveform segment are interconnected.

Further, the instant embodiment permits a smooth connection between a style-of-rendition module of an attack portion and a style-of-rendition module of a release or joint portion. FIGS. 8C and 8D are conceptual diagrams explanatory of a waveform thinning-out operation performed when the attack-portion waveform and release-portion waveform are interconnected.

In this case, waveform thinning-out of the style-of-redition module of the attack portion, release portion or the like is sometimes possible but sometimes impossible. Examples of the attack portion whose style-of-rendition module can be subjected to the waveform thinning-out operation include a bendup attack portion that has several loop waveform segments in its latter half. Release-portion having several loop waveform segments in its former half can also be subjected to the waveform thinning-out operation. Thus, the instant embodiment thins out only the waveform of such a style-of-rendition module that can be subjected to the waveform thinning-out operation. For example, when the bend attack portion and release portion are interconnected, one or more of the loop waveform segments of the bend attack portion are thinned out (in the illustrated example of FIG. 8C, only one of the loop waveform segments is thinned out as denoted by a rectangular mark filled in with black). When the normal attack portion and release portion having loop waveform segments are interconnected, one or more of the loop waveform segments of the release portion are thinned out (in the illustrated example of FIG. 8D, only one of the loop waveform segments is thinned out as denoted by a rectangular mark filled in with black).

It should be appreciated here that the loop waveform segment to be thinned out in the instant embodiment need not necessarily be the one closest to the waveform-interconnecting point (such as the leading or last loop waveform segment) and such a loop waveform segment to be thinned out may be designated from among a plurality of loop waveform segments in accordance with predetermined priority order.

As described above, the instant embodiment is constructed to perform the waveform thinning-out operation when adjoining style-of-rendition modules can not be properly interconnected within the bounds of certain style-of-rendition parameters. For this purpose, there are provided, in the instant embodiment, a "style-of-rendition module combination table", "thinning-out parameter range table" to be referred to from the style-of-rendition module combination table, and a "thinning-out time table" to be further referred to from the thinning-out parameter range table. The style-of-rendition module combination table is a table to be used for determining predetermined parameters in accordance with a combination of adjoining style-of-redition modules to be interconnected. The thinning-out parameter range table is a table to be used for determining a time range within which the waveform thinning-out operation is to be effected for each of the parameters. Further, the thinning-out time table is a table to be used for determining a time length of the waveform thinning-out. If a time difference between the waveform-interconnecting point and the leading or last loop waveform segment L1 (or L6') (i.e., the time t shown in FIGS. 8A–8D) is shorter than a predetermined reference thinning-out time length, then the leading or last loop waveform segment is thinned out in the instant embodiment.

Figure 9:
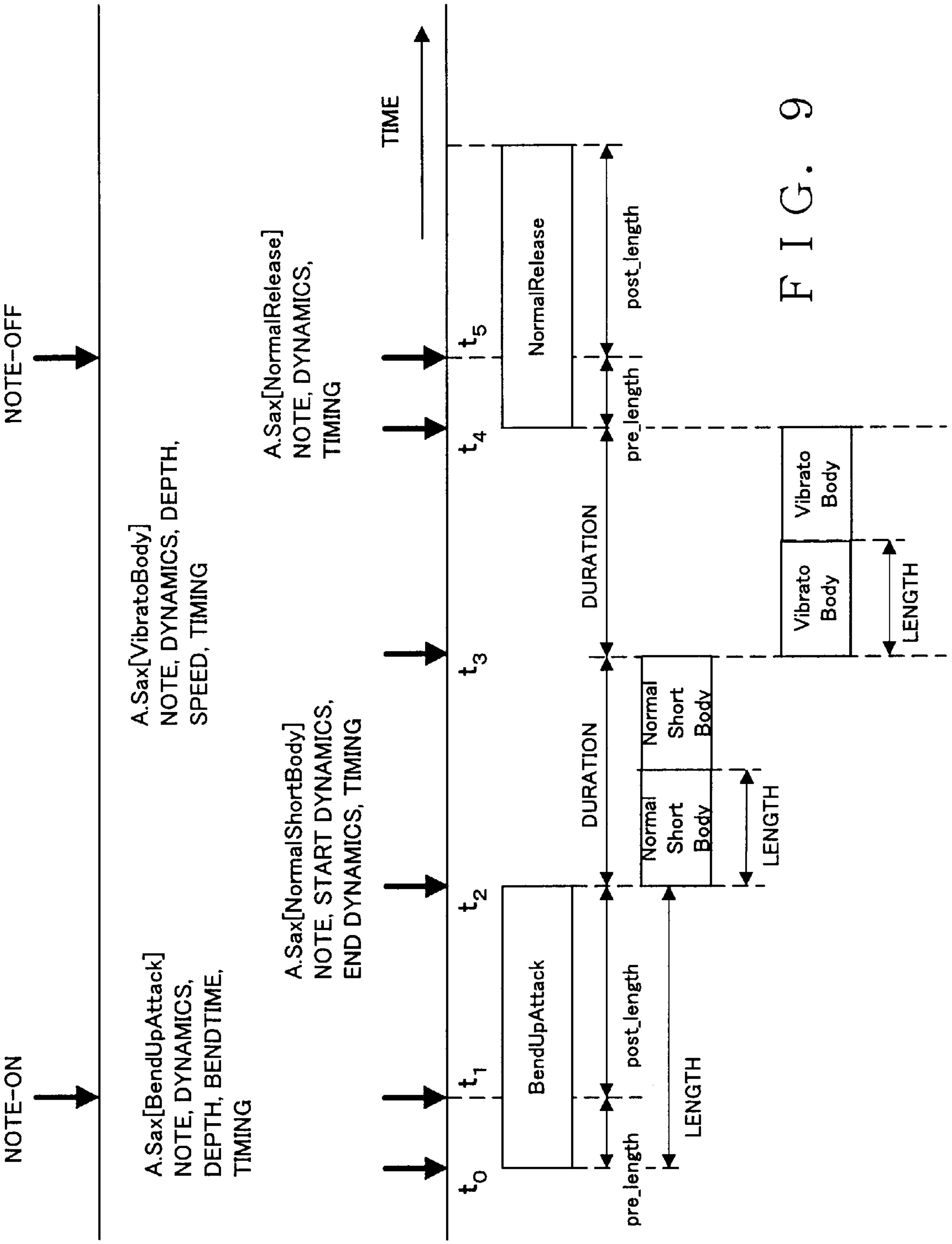
FIG. 9 is a conceptual diagram explanatory of a waveform linking process performed in a situation where a sampled length of a style-of-rendition module is so short that it would end before another style-of-rendition module following the same starts.

Further, the following paragraphs describe the waveform linking process performed in a situation where the sampled length of a style-of-rendition module is so short that it would end before another style-of-rendition module following the same starts, with reference to FIG. 9. Here, the description is made in relation to a waveform shape (timbre) factor packet stream that is made, in the left-to-right direction (in a time-serial fashion), of four style-of-rendition modules: A.Sax[BendupAttack]; A.Sax[NormalShortBody]; A.Sax [VibratoBody]; and A.Sax[NormalRelease]. Sampled lengths of the individual ones of the four style-of-rendition modules (waveform section lengths) are each denoted by "length" in the figure. "note-on" and "note-off" on the top row of FIG. 9 each represent event timing of MIDI data, "A.Sax[BendupAttack]" etc. on the middle row each represent generation timing of a corresponding style of rendition ID and "note", "dynamics", "depth", etc. on the middle row each represent generation timing of corresponding style-of-redition parameters.

The A.Sax[BendupAttack] module is caused to start at time point $t_0$. Time point t1 represents note-on timing within the style-of-rendition module and is made to coincide with instructed note-on timing. The contents of the module in the packet stream are controlled on the basis of the style-of-rendition parameters such as those of the note, dynamics and depth. The A.Sax[NormalShortBody] module is caused to start at time point t2. Time point t3 represents timing when a vibrato rendition starts at a halfway point in the waveform-interconnecting region, and this timing is determined, for example, on the basis of start timing of a vibrato mark imparted to the music piece data. Time point t5 represents note-off timing in the A.Sax[NormalRelease] module and is made to coincide with instructed note-off timing. Starting time point t4 of the A.Sax[NormalRelease] module is determined in accordance with the note-off timing of the A.Sax [NormalRelease] module. Namely, because the note-on timing occurs at time point t1 and the corresponding note-off timing occurs at time point t5, actual generation of a tone in accordance with a waveform produced from the packet stream takes place over a time period from time point t1 to time point t5. In the case of this packet stream, the time length from time point t2 to time point t4 and the total of the respective sampled lengths of the A.Sax[NormalRelease] and A.Sax[VibratoBody] modules intervening between time point t2 and time point t4 often do not match each other, which must be properly dealt with. For this purpose, in the instant embodiment, the total of the respective sampled lengths of the A.Sax[NormalRelease] and A.Sax [VibratoBody] modules is made to coincide with the time length from time point t2 to time point t4 by repeating one of the modules, changing the sampled length of the module (s) or using an appropriate combination of parts of the two modules. Namely, the instant embodiment of the present invention is arranged to perform the waveform linking process with appropriate adjustments between the modules as necessary. Specifically, in the illustrated example, the waveform interlinking operation is performed between the A.Sax[NormalShortBody] and A.Sax[VibratoBody] modules with the preceding A.Sax[NormalShortBody] module repeated, and similarly, the waveform interlinking operation is performed between the A.Sax[VibratoBody] and A.Sax [NormalRelease] modules with the preceding A.Sax [VibratoBody] module repeated.

In the case where the waveform interlinking operation is performed between adjoining style-of-rendition modules by repeating one of the modules as described above, the time length of the repeated module is variably controlled. The variable control of the module time length, in the illustrated example, is effected by moving the representative points of the A.Sax[NormalShortBody] or A.Sax[VibratoBody] module; that is, the module time length is controlled in an appropriate manner, such as by changing a time length of cross-fade connection between a plurality of loop waveform segments constituting the module. In the case of the loop waveform segment, the time length of the entire loop reproduction can be variably controlled relatively easily by varying the number of loops or loop-lasting time. In the case of the nonloop waveform segment, however, its length along the time axis can not be variably controlled so easily. Thus, a scheme of variably controlling the sounding time length of the entire waveform of a tone comprising nonloop and loop waveform segments is very preferable in that it greatly facilitates time stretch/compression control. For this purpose, it will be advantageous to employ the "time stretch/compression control" (abbreviated "TSC") proposed earlier by the assignee of the present patent application in Japanese Patent Laid-open Publication No. HEI-10-307586; the proposed stretch/compression control can be advantageously applied to variably control the time-axial length of a nonloop waveform corresponding to a particular style of rendition.

Figure 10:
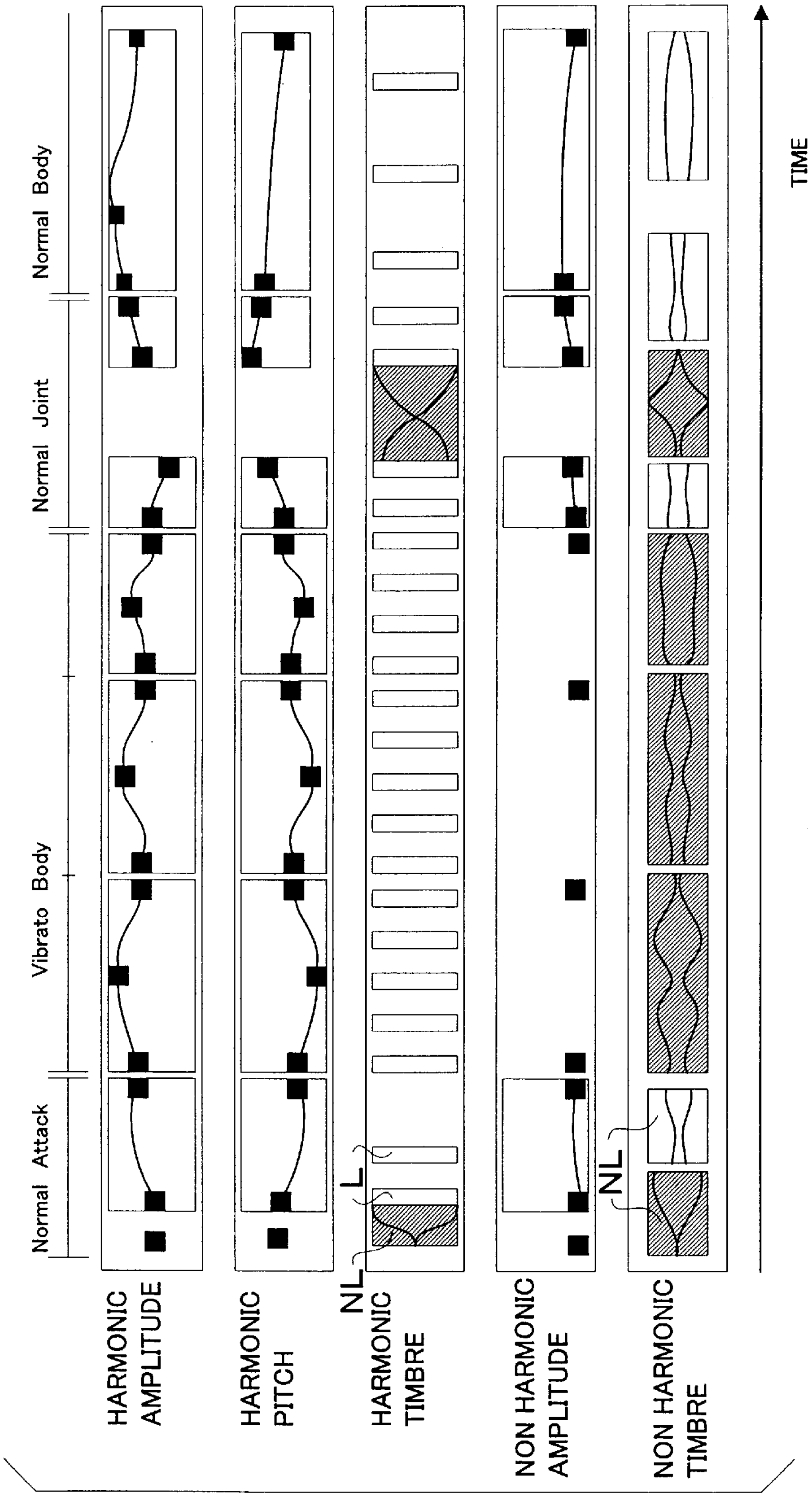
FIG. 10 is a conceptual diagram explanatory of exemplary packet streams.

FIG. 10 is a diagram conceptually showing exemplary packet streams created in the above-described manner. Sequentially in the top-to-bottom direction of FIG. 10, there are shown packet streams of amplitude, waveform shape (Timbre) and pitch factors of a harmonic component and amplitude and waveform shape (timbre) factors of a nonharmonic component. Further, in FIG. 10, square marks filled in with black represent the representative points in the amplitude, waveform shape (timbre) and pitch factors of the harmonic component and amplitude and waveform shape (timbre) factors of the nonharmonic component. Curves connecting these representative points each represent a shape of a vector designated by a vector ID included in one of the packets in the packet stream. Further, in the waveform shape (timbre) factor of each of the harmonic and nonharmonic components, blank rectangular blocks L each represent a loop waveform segment and other rectangular blocks NL each represent a nonloop waveform segment. Of the nonloop waveform segments, those denoted by hatched rectangular blocks are particularly characteristic nonloop waveform segments. Further, in the illustrated example of FIG. 10, the waveform shape (timbre) factor of each of the harmonic and nonharmonic components comprises two vectors, and each of the amplitude and pitch factors of the harmonic component and amplitude factor of the nonharmonic component comprises a single vector. Furthermore, for each of the harmonic and nonharmonic components in the illustrated example of FIG. 10, the amplitude and pitch factors have no vector in their regions that correspond in position to the nonloop waveform segment of the waveform shape (timbre) factor. However, even in the regions corresponding in position to the nonloop waveform segment of the waveform shape (timbre) factor, each of the amplitude and pitch factors may have a vector so that the waveform to be produced is controlled in accordance with the vector. In the VibratoBody module, the waveform shape (timbre) factor of the harmonic component comprises five vectors, and each of the amplitude and pitch factors of the harmonic component and waveform shape (timbre) and amplitude factors of the nonharmonic component comprises a single vector. Here, note that although the VibratoBody module is shown as repeated three times, the vector shape differs for each occurrence of the module; this is because different style-of-rendition parameters are designated for each occurrence of the module. In the instant embodiment, different waveform factor data are selected or different level control or time-axial control is performed, in accordance with the different style-of-rendition parameters. Further, in the NormalJoint module, the waveform shape (timbre) factors of the harmonic component and nonharmonic component each comprise three vectors, and each of the amplitude and pitch factors of the harmonic component and amplitude factor of the nonharmonic component comprises two vectors. Description of the NormalBody module is omitted here.

In the above-mentioned manner, the style-of-rendition synthesis section 101C creates a packet stream for each of the waveform components (i.e., harmonic and nonharmonic components). Each of these packet streams comprises a plurality of packets each including a vector ID and time information of the packet. In addition, each of the amplitude and pitch factors of the harmonic component and amplitude factor of the nonharmonic component includes definite values of the individual representative values. Of course, the present invention is not so limited, and each of the packets may include any other information in addition to the vector ID and time information of the packet. Thus, a packet stream is constructed, for each of the waveform factors, in accordance with the contents of the individual packets.

It should be appreciated that the number of the packet streams may differ depending on the type of the musical instrument or the like.

Figure 11:
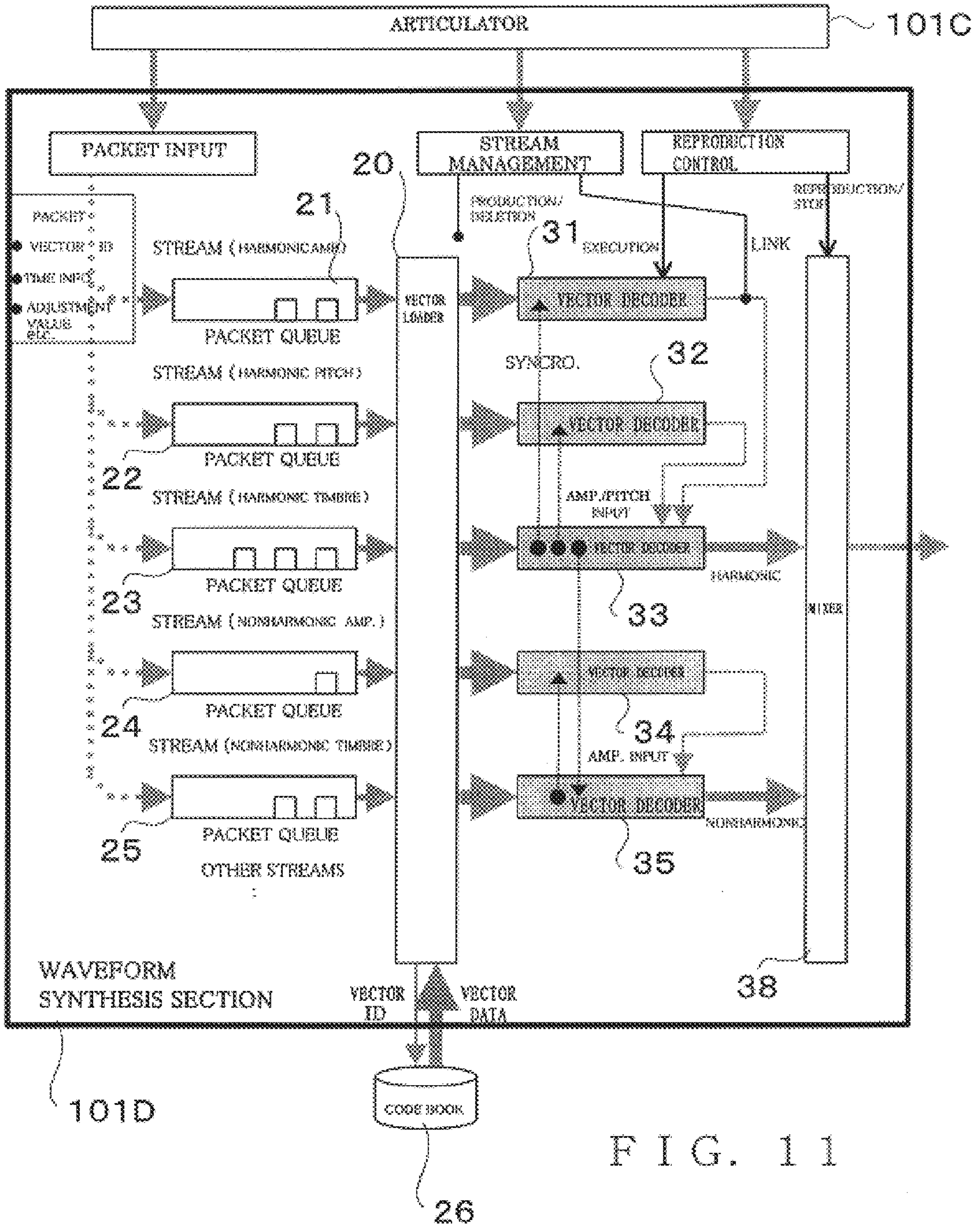
FIG. 11 is a conceptual block diagram of a general organization of a waveform synthesis section, which is also explanatory of behavior of the waveform synthesis section.
Figure 12:
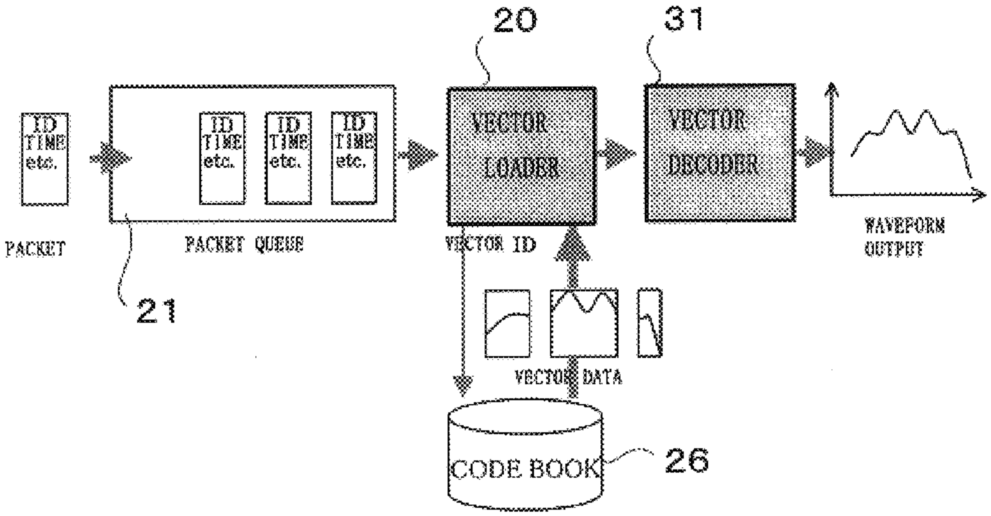
FIG. 12 is a block diagram outlining a general operational flow of the waveform synthesis.
Figure 13:
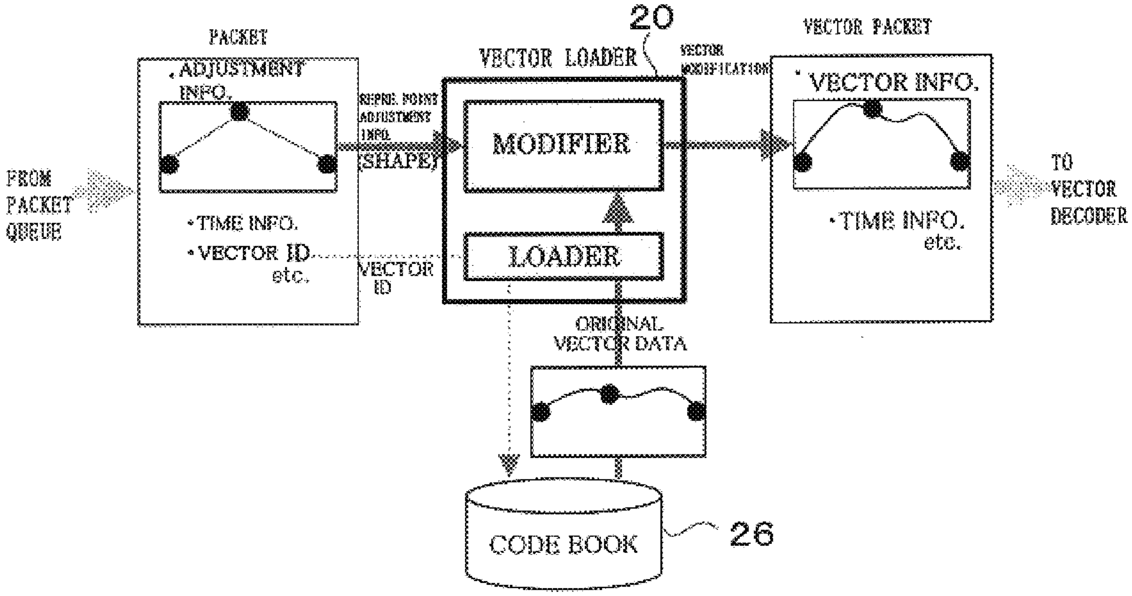
FIG. 13 is a block diagram explanatory of a vector loader.
Figure 14:
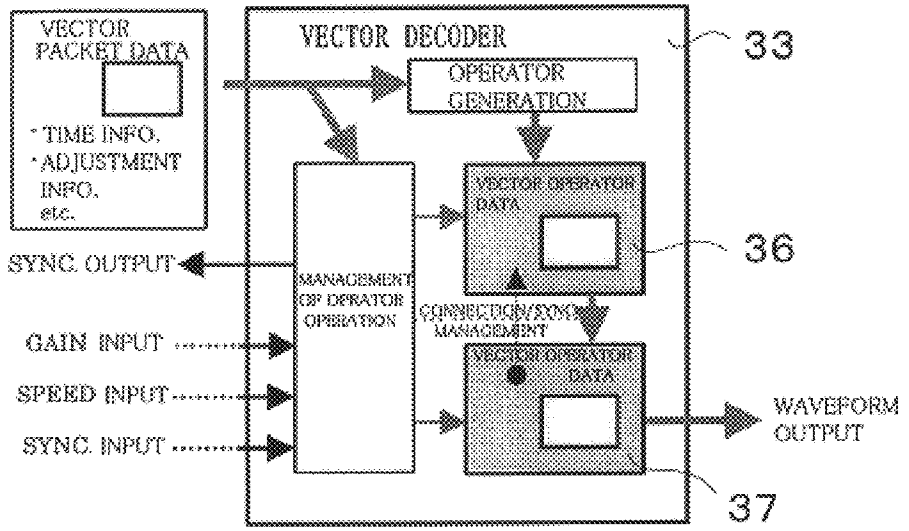
FIG. 14 is a block diagram explanatory of a vector operator.
Figure 15:
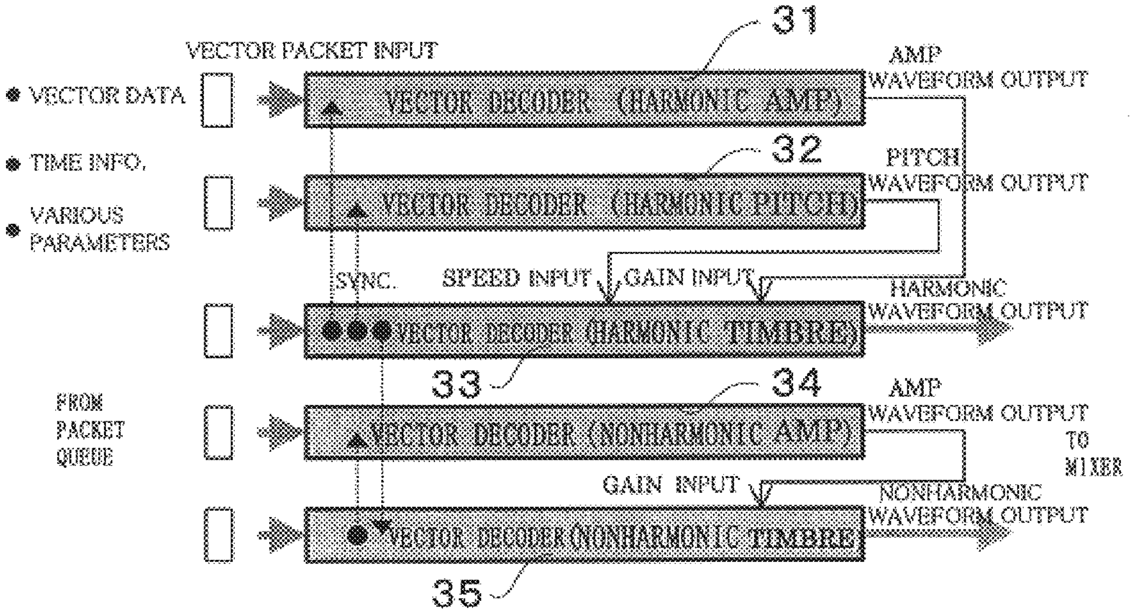
FIG. 15 is a block diagram explanatory of a vector decoder.

The waveform synthesis section 101D synthesizes a waveform on the basis of the packet streams (i.e., streams of packets each including a vector ID, time information, adjustment information, etc.) for each of the waveform factors which are supplied from the style-of-rendition synthesis section 101C. FIG. 11 is a conceptual block diagram of a general organization of the waveform synthesis section 101D, which is explanatory of behavior of the synthesis section 101D. FIGS. 12–15 are block diagrams showing details of individual operations performed by the waveform synthesis section 101D, of which FIG. 12 is a block diagram outlining a general operational flow of the waveform synthesis, FIG. 13 is a block diagram explanatory of a vector loader, FIG. 14 is a block diagram explanatory of a vector operator and FIG. 15 is a block diagram explanatory of a vector decoder.

Packet streams, created for the individual waveform factors of the harmonic and nonharmonic components by the style-of-rendition synthesis section (articulator) 101C, are sequentially input, on a packet-by-packet basis, to predetermined packet queue buffers 21–25 that are provided in the waveform synthesis section 101D in corresponding relation to the waveform factors of the harmonic and nonharmonic components. After being accumulated in the respective packet queue buffers 21–25, the packets are sent to the vector loader 20 in predetermined order, and the vector loader 20 refers to the vector ID of each of the packets to read out, from the code book 26, the original vector data corresponding to the vector ID (original vector data loading). The read-out vector data are then delivered to the vector decoders 31–35 provided in corresponding relation to the waveform factors of the harmonic and nonharmonic components, via which waveforms for the individual waveform factors are produced in predetermined synchronized relation to each other. The thus-produced waveforms for the individual waveform factors are then passed to a mixer 38. In addition to inputting the packets to the packet queue buffers 21–25, the style-of-rendition synthesis section (articulator) 101C performs various control for the waveform synthesis section 101D, such as packet stream management (i.e., management pertaining to production or deletion of the individual vector data or interconnection between the vector data) and reproduction control (i.e., control pertaining to production of a desired waveform or reproduction/stop of the produced desired waveform).

As noted above, the packets constituting the packet streams, having been accumulated in the packet queue buffer 21, are sequentially sent to the vector loader 20, and the vector loader 20 reads out, from the code book 26, the original vector data corresponding to the vector ID of each of the packets and delivers the read-out vector data to the vector decoder 21 (see FIG. 12). Some of the read-out vector data may include adjustment information (e.g., adjustment information pertaining to the representative points). In such a case, the vector loader 20 modifies the read-out original vector data in accordance with the adjustment information and then outputs the packets having the modified vector data (which will hereinafter be called "vector information data" to differentiate from the "original vector data") to the vector decoders 31–35. Namely, the vector loader 20 reads out, from the code book 26, the original vector data on the basis of the vector IDs of the packets input from the style-of-rendition synthesis section (articulator) 101C, modifies the vector data in accordance with the adjustment information as necessary, and then passes the vector packets to the respective vector decoders 31–35 (see FIG. 13). Examples of the adjustment information pertaining to the representative points of the above-mentioned vector data include various information, such as one for changing the time information, for example, on the basis of a random number.

Further, as shown in FIG. 14, each of the vector decoders 31–35 generates or cancels a vector operator for processing the input vector packet and performs various management as to operation of the vector operator, such as connection/synchronization between the vector operators, time management and conversion into parameters in vector operators input from another vector ID stream. The vector operators 36 and 37 read out the vector information data and perform control of readout positions (speed inputs) and gains (gain inputs) of the vector information data. Various parameters set in the vector operators 36 and 37 are managed by the corresponding vector decoder 31–35. The vector decoder 31–35, which are provided in corresponding relation to the waveform factors, each read out the vector information data and time-serially produce a desired waveform. As illustratively shown in FIG. 15, the vector decoder 31 produces an envelope waveform of the amplitude factor of the harmonic component, the vector decoder 32 produces an envelope waveform of the pitch factor of the harmonic component, and the vector decoder 33 produces a waveform of the waveform shape (timbre) factor of the harmonic component. Further, the vector decoder 34 produces an envelope waveform of the amplitude factor of the nonharmonic component, and the vector decoder 35 produces an envelope waveform of the waveform shape (timbre) factor of the nonharmonic component. The vector decoder 33 produces a waveform of the harmonic component which has imparted thereto the envelope waveform of the amplitude factor of the harmonic component produced by the vector decoder 31 and the envelope waveform of the pitch factor of the harmonic component produced by the vector decoder 32, and then outputs the thus-produced waveform to the mixer 38. Namely, for the waveform reproduction, the vector decoder 33 is supplied with the above-mentioned envelope waveform of the amplitude factor of the harmonic component as the vector operator for performing the gain (gain input) control, and the above-mentioned envelope waveform of the pitch factor of the harmonic component as the vector operator for performing the readout position (speed input control) control of the vector information data. Similarly, the vector decoder 35 produces a waveform of the nonharmonic component which has imparted thereto the envelope waveform of the amplitude factor of the nonharmonic component produced by the vector decoder 34 and then outputs the thus-produced waveform to the mixer 38. Namely, for the waveform production, the vector decoder 35 is supplied with the above-mentioned envelope waveform of the amplitude factor of the nonharmonic component as a control instruction for performing the gain (gain input) control.

Further, in the instant embodiment of the invention, the time-serial waveform production for the individual waveform factors of the harmonic and nonharmonic components is performed while keeping waveform synchronization between the vector decoders 31–35. If vector packets of the waveform shape (timbre) and amplitude factors have been input, an amplitude waveform based on the vector packet of the amplitude factor is produced in synchronism with a waveform producing time based on the waveform shape (timbre) factor vector packet. The amplitude of the waveform produced on the basis of the waveform shape (timbre) factor vector packet is controlled by the thus-produced amplitude waveform. Further, if vector packets of the waveform shape (timbre) and pitch factors have been input, a pitch waveform based on the pitch factor vector packet is synthesized in synchronism with a waveform producing time based on the waveform shape (timbre) factor vector packet, and the pitch of the waveform produced on the basis of the waveform shape (timbre) factor vector packet is controlled by the thus-synthesized pitch waveform. Further, if a vector packet of the waveform shape (timbre) of the harmonic component and a vector packet of the waveform shape (timbre) of the nonharmonic component have been input, a nonharmonic component based on the waveform shape (timbre) vector packet of the nonharmonic component is synthesized in synchronism with a harmonic component synthesizing time based on the waveform shape (timbre) factor vector packet of the harmonic component. Then, a desired tone waveform is produced by mixing the synthesized waveforms of the harmonic and nonharmonic components.

Note that the instant embodiment may be arranged to permit a selection as to whether or not the harmonic and nonharmonic components should be synchronized. In this case, only when the synchronization between the harmonic and nonharmonic components has been selected, a nonharmonic component based on the waveform shape (timbre) vector packet of the nonharmonic component may be synthesized in synchronism with the harmonic component synthesizing time based on the waveform shape (timbre) factor vector packet of the harmonic component.

As noted previously, each of the packet streams consists of a plurality of packets. In the case of the packet stream of vector packets, for example, each of the vector packets include vector data; namely, the packet stream comprises a time series of the vector data. Although different in the data organization and meaning, the vector data of the amplitude factor, pitch factor and waveform shape factor appear to be fundamentally the same, in principle, as viewed from the vector operators 36 and 37.

Figure 16:
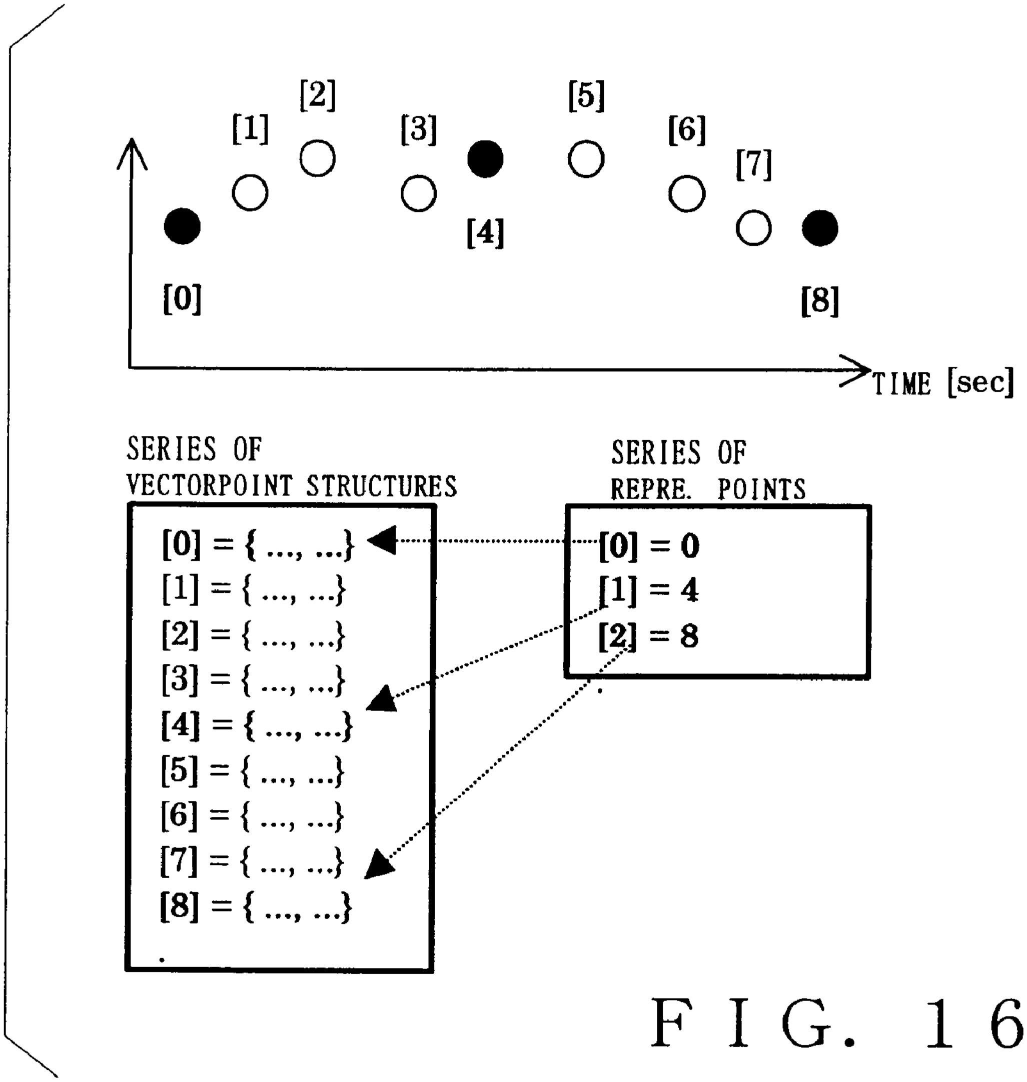
FIG. 16 is a diagram conceptually showing an exemplary data organization of vector data.

Finally, FIG. 16 is a diagram conceptually showing an exemplary data organization in the vector data. In the illustrated example of FIG. 16, the readout time position of the vector data is expressed in seconds, and assuming that the data readout speed is uniform, each sample of the vector data corresponds to one sample of an output waveform. Further, in the instant embodiment, the minimum unit of the data readout rate is 1/1200 cents (=nth power of 2); thus, if the power n is "0", the data readout rate is kept uniform, if the power n is "1.0", the data readout rate is raised by a factor of 2 (raised by one octave in the case of the waveform shape (timbre) factor), or if the power n is "−1.0", the data readout rate is lowered by a factor of 0.5 (lowered by one octave in the case of the waveform shape (timbre) factor) (see the upper column of FIG. 16). Furthermore, in the code book 26, there are stored actual vector data. For example, the vector data of the amplitude factor or pitch factor comprise a series of vector point structures and data of representative points. The series of vector point structures comprises a sequence of sets of sample positions and values at the individual points. For example, the values of the amplitude factor vector data are expressed in decibels, and the values of the pitch factor vector data are expressed in 1/1200 cents based on the assumption that MIDI note number "0" has a value "0.0". Further, the data of the representative points are in the word (double word) arrangement, where are stored index numbers of the vector point structures as the representative points (see the lower column of FIG. 16). Of course, the present invention should not be construed as limited to the above-noted vector data organization, and may be modified variously.

Note that in the case where the above-described waveform producing apparatus is applied to an electronic musical instrument, the electronic musical instrument may be of any type other than the keyboard-based instrument, such as a stringed, wind or percussion instrument. In such a case, the present invention is of course applicable not only to such an electronic musical instrument where all of the music-piece-data reproduction section 101A, musical score interpretation section 101B, style-of-rendition synthesis section 101C, waveform synthesis section 101D and the like are incorporated together as a unit, but also to another type of electronic musical instrument where the above-mentioned sections are provided separately and interconnected via communication facilities such as a MIDI interface, various networks and the like. Further, the waveform producing apparatus of the present invention may comprise a combination of a personal computer and application software, in which case various processing programs may be supplied to the waveform producing apparatus from a storage media such as a magnetic disk, optical disk or semiconductor memory or via a communication network. Furthermore, the waveform producing apparatus of the present invention may be applied to automatic performance apparatus such as a player piano.

In summary, the present invention having been described so far is characterized in that when adjoining, i.e. preceding and succeeding, waveform-forming module data are to be interlinked, a mutual approaching rate is designated and the preceding and succeeding module data are modified in accordance with the designated mutual approaching rate. The modification based on the mutual approaching rate allows the preceding and succeeding module data to approach each other, and thus the present invention provides for smooth link or connection between the two module data. Further, by designating a link starting point in the preceding module data and/or a link ending point in the succeeding module data, the present invention advantageously allows the preceding and succeeding module data to be interlinked to an appropriate degree depending on a difference or degree of similarity between the two module data. Furthermore, with the arrangement that if the preceding or succeeding module data include data of a plurality of vectors, a time relationship between the preceding and succeeding module data is evaluated and the data of one or more of the vectors is thinned out, as necessary, in accordance with the evaluated time relationship, the present invention advantageously allows the two module data to be interlinked appropriately.

What is claimed is:

1. A method of producing a waveform using waveform-forming module data, said method comprising the steps of:

supplying preceding module data and succeeding module data;

supplying a modifying rate;

modifying the preceding module data and succeeding module data in accordance with the modifying rate; and producing a waveform on the basis of the preceding module data and succeeding module data modified by said step of modifying.

2. A method as claimed in claim 1 wherein said modifying rate is a mutual approaching rate indicating which of the preceding module data and succeeding module data should be modified and at which rate the module data should be modified, in such a manner that the preceding module data and succeeding module data can be smoothly interlinked through modification based on the modifying rate.

3. A method as claimed in claim 1 wherein said step of supplying a modifying rate supplies the modifying rate on the basis of a distance between respective connecting portions of the preceding module data and succeeding module data.

4. A waveform producing apparatus comprising:

a memory adapted to supply waveform-forming module data; and a processor coupled with said memory and adapted to:

read out from, said memory, preceding module data and succeeding module data;

supply a modifying rate;

modify the preceding module data and succeeding module data in accordance with the supplied modifying rate; and produce a waveform on the basis of the modified preceding module data and succeeding module data.

5. A machine-readable storage medium containing a group of instructions to cause said machine to implement a method of producing a waveform using waveform-forming module data, said method comprising the steps of:

receiving preceding module data and succeeding module data;

supplying a modifying rate;

modifying the preceding module data and succeeding module data in accordance with the modifying rate; and producing a waveform on the basis of the preceding module data and succeeding module data modified by said step of modifying.

6. A method of producing a waveform using waveform-forming module data, said method comprising the steps of:

supplying preceding module data and succeeding module data;

designating a link starting point in the preceding module data;

modifying data in the preceding module data at and after the link starting point; and producing a waveform on the basis of the preceding module data modified by said step of modifying and the succeeding module data.

7. A method as claimed in claim 6 wherein said step of designating a link starting point designates the link starting point on the basis of a distance between respective connecting portions of the preceding module data and succeeding module data.

8. A waveform producing apparatus comprising:

a memory adapted to supply waveform-forming module data; and a processor coupled with said memory and adapted to:

read out, from said memory, preceding module data and succeeding module data;

designate a link starting point in the preceding module data;

modify data in the preceding module data at and after the link starting point; and produce a waveform on the basis of the modified preceding module data and the succeeding module data.

9. A machine-readable storage medium containing a group of instructions to cause said machine to implement a method of producing a waveform using waveform-forming module data, said method comprising the steps of:

receiving preceding module data and succeeding module data;

designating a link starting point in the preceding module data;

modifying data in the preceding module data at and after the link starting point; and producing a waveform on the basis of the preceding module data modified by said step of modifying and the succeeding module data.

10. A method of producing a waveform using waveform-forming module data, said method comprising the steps of:

supplying preceding module data and succeeding module data;

designating a link ending point in the succeeding module data;

modifying data in the succeeding module data at and after the link ending point; and producing a waveform on the basis of the preceding module data and the succeeding module data modified by said step of modifying.

11. A method as claimed in claim 10 wherein said step of designating a link ending point designates the link ending point on the basis of a distance between respective connecting portions of the preceding module data and succeeding module data.

12. A waveform producing apparatus comprising:

a memory adapted to supply waveform-forming module data; and a processor coupled with said memory and adapted to:

read out, from said memory, preceding module data and succeeding module data;

designate a link ending point in the succeeding module data;

modify data in the succeeding module data at and after the link ending point; and produce a waveform on the basis of the preceding module data and the modified succeeding module data.

13. A machine-readable storage medium containing a group of instructions to cause said machine to implement a method of producing a waveform using waveform-forming module data, said method comprising the steps of:

receiving preceding module data and succeeding module data;

designating a link ending point in the succeeding module data;

modifying data in the succeeding module data at and after the link ending point; and producing a waveform on the basis of the preceding module data and the succeeding module data modified by said step of modifying.

14. A method of producing a waveform using waveform-forming module data, said method comprising the steps of:

supplying preceding module data and succeeding module data, said preceding module data including data of a plurality of vectors;

thinning out the data of one or more of the plurality of vectors in the preceding module data in accordance with a evaluated time relationship between the preceding module data and the succeeding module data and; and producing a waveform on the basis of the preceding module data thinned out by said step of thinning out and the succeeding module data.

15. A method as claimed in claim 14 wherein said step of thinning out selects one or more of the plurality of vectors in accordance with the evaluated time relationship and predetermined order of priority and thins out the data of the selected one or more vectors.

16. A waveform producing apparatus comprising:

a memory adapted to supply waveform-forming module data; and a processor coupled with said memory and adapted to:

read out, from said memory, preceding module data and succeeding module data, said preceding module data including data of a plurality of vectors;

thin out the data of one or more of the plurality of vectors in the preceding module data in accordance with an evaluated time relationship between the preceding module data and the succeeding module data and; and produce a waveform on the basis of the thinned-out preceding module data and the succeeding module data.

17. A machine-readable storage medium containing a group of instructions to cause said machine to implement a method of producing a waveform using waveform-forming module data, said method comprising the steps of:

receiving preceding module data and succeeding module data, said preceding module data including data of a plurality of vectors;

thinning out the data of one or more of the plurality of vectors in the preceding module data in accordance with an evaluated time relationship between the preceding module data and the succeeding module data and; and producing a waveform on the basis of the preceding module data thinned out by said step of thinning out and the succeeding module data.

18. A method of producing a waveform using waveform-forming module data, said method comprising the steps of:

supplying preceding module data and succeeding module data, said succeeding module data including data of a plurality of vectors;

thinning out the data of one or more of the plurality of vectors in the succeeding module data in accordance with an evaluated time relationship between the preceding module data and the succeeding module data and; and producing a waveform on the basis of the preceding module data and the succeeding module data thinned out by said step of thinning out.

19. A method as claimed in claim 18 wherein said step of thinning out selects one or more of the plurality of vectors in accordance with the evaluated time relationship and predetermined order of priority and thins out the data of the selected one or more vectors.

20. A waveform producing apparatus comprising:

a memory adapted to supply waveform-forming module data; and a processor coupled with said memory and adapted to:

read out, from said memory, preceding module data and succeeding module data, said succeeding module data including data of a plurality of vectors;

thin out the data of one or more of the plurality of vectors in the succeeding module data in accordance with an evaluated time relationship between the preceding module data and the succeeding module data and; and produce a waveform on the basis of the preceding module data and the thinned-out succeeding module data.

21. A machine-readable storage medium containing a group of instructions to cause said machine to implement a method of producing a waveform using waveform-forming module data, said method comprising the steps of:

receiving preceding module data and succeeding module data, said succeeding module data including data of a plurality of vectors;

thinning out the data of one or more of the plurality of vectors in the succeeding module data in accordance with an evaluated time relationship between the preceding module data and the succeeding module data and; and producing a waveform on the basis of the preceding module data and the succeeding module data thinned out by said step of thinning out.

* * * * *